US012676797B2

(12) United States Patent
Das et al.

(10) Patent No.:   US 12,676,797 B2
(45) Date of Patent:      Jul. 7, 2026

(54) METHODS AND APPARATUS TO DYNAMICALLY MANAGE AUDIBLY PROXIMATE DEVICES DURING USER ACTIVITIES

(71) Applicant: Intel Corporation, Santa Clara, CA (US)

(72) Inventors: Sajal Kumar Das, Bangalore (IN); Ofer Hareuveni, Haifa (IL); Neeraj Kumar Singh, Bangalore (IN); Rajesh S P, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 17/955,390

(22) Filed: Sep. 28, 2022

(65) Prior Publication Data

US 2023/0027833 A1      Jan. 26, 2023

(51) Int. Cl.
*H04L 41/12*        (2022.01)
*G06F 3/16*         (2006.01)

(52) U.S. Cl.
CPC .............. *H04L 41/12* (2013.01); *G06F 3/167* (2013.01)

(58) Field of Classification Search
CPC ................................. H04L 41/12; G06F 3/167
USPC ......................................................... 709/223
See application file for complete search history.

(56) References Cited

U.S. PATENT DOCUMENTS

| | | | | | |
|---|---|---|---|---|---|
| 2015/0365762 | A1* | 12/2015 | Truon | ...................... | H04R 3/04 |
| | | | | | 381/71.1 |
| 2018/0349093 | A1* | 12/2018 | McCarty | ................. | G06F 3/167 |
| 2020/0310751 | A1* | 10/2020 | Anand | ................. | H04R 1/1041 |
| 2021/0012780 | A1* | 1/2021 | Nicholson | ............... | G06F 3/167 |
| 2021/0314699 | A1* | 10/2021 | Stahl | ........................ | H04R 3/00 |
| 2022/0057983 | A1* | 2/2022 | Vega-Zayas | ............ | H04S 7/301 |

OTHER PUBLICATIONS

Meir Orbach, "Intel acquiring Israel's Screenovate for $150 million," Article from Calcalist, published on Jun. 6, 2021, retrieved from <https://www.calcalistech.com/ctech/articles/0,7340,L-3924334,00.html#:~:text=Screenovate%2C%20founded%20in%202010%2C%20developed, smartphone%20into%20a%20game%20controller> on Feb. 17, 2023, 2 pages.

* cited by examiner

*Primary Examiner* — Ruolei Zong
(74) *Attorney, Agent, or Firm* — Hanley, Flight & Zimmerman, LLC

(57)                ABSTRACT
Methods, apparatus, systems, and articles of manufacture are disclosed. In an example, the apparatus includes interface circuitry to communicatively couple a processor circuitry to a memory. The apparatus also includes the processor circuitry to perform at least one operation to instantiate circuitry. The circuitry includes device discovery management circuitry to discover a controllable device in audible proximity to a microphone, the microphone associated with a primary device and output sound capability determination circuitry to determine an output sound capability of the controllable device. Additionally, the circuitry includes function modification circuitry to modify a function of the controllable device to reduce the output sound capability.

24 Claims, 10 Drawing Sheets

| CONTROLLABLE DEVICE NAME | IP ADDRESS | FUNCTION(S) INFORMATION | LOCATION INFORMATION | COMMUNICATION INQUIRY INSTRUCTIONS | OUTPUT SOUND CAPABILITIES | ⋮ |
|---|---|---|---|---|---|---|
| DEVICE A | 123.456.7.12 | 1) ON/OFF 2) SPEED | GEO-FENCE DATA | N/A | 1) SOUND TYPE 2) DECIBEL LEVEL | ⋮ |
| DEVICE B | 123.456.7.34 | 1) MUTE/UNMUTE | GPS DATA | 1) LOW PRIORITY 2) HIGH PRIORITY | 1) SOUND TYPE 2) DECIBEL LEVEL | ⋮ |

START

402 — DISCOVER A CONTROLLABLE DEVICE IN AUDIBLE PROXIMITY TO MICROPHONE ASSOCIATED WITH A PRIMARY DEVICE

404 — DETERMINE OUTPUT SOUND CAPABILITY OF THE CONTROLLABLE DEVICE

406 — ENABLE A CONFERENCE MODE AT THE PRIMARY DEVICE

408 — MODIFY A FUNCTION OF THE CONTROLLABLE DEVICE

END

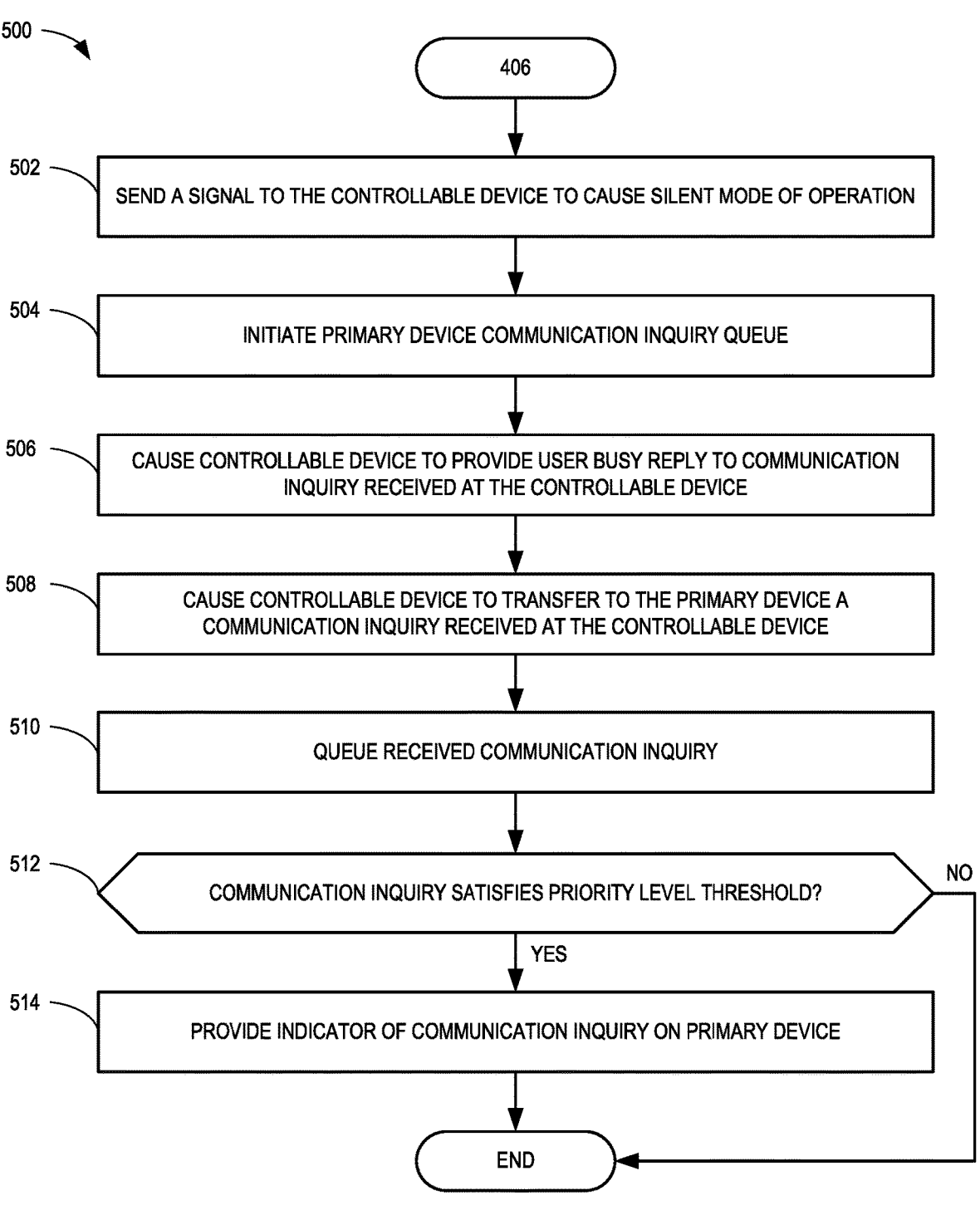

500

406

502 — SEND A SIGNAL TO THE CONTROLLABLE DEVICE TO CAUSE SILENT MODE OF OPERATION

504 — INITIATE PRIMARY DEVICE COMMUNICATION INQUIRY QUEUE

506 — CAUSE CONTROLLABLE DEVICE TO PROVIDE USER BUSY REPLY TO COMMUNICATION INQUIRY RECEIVED AT THE CONTROLLABLE DEVICE

508 — CAUSE CONTROLLABLE DEVICE TO TRANSFER TO THE PRIMARY DEVICE A COMMUNICATION INQUIRY RECEIVED AT THE CONTROLLABLE DEVICE

510 — QUEUE RECEIVED COMMUNICATION INQUIRY

512 — COMMUNICATION INQUIRY SATISFIES PRIORITY LEVEL THRESHOLD?    NO

YES

514 — PROVIDE INDICATOR OF COMMUNICATION INQUIRY ON PRIMARY DEVICE

END

FIG. 5

METHODS AND APPARATUS TO DYNAMICALLY MANAGE AUDIBLY PROXIMATE DEVICES DURING USER ACTIVITIES

FIELD OF THE DISCLOSURE

This disclosure relates generally to mobile devices and, more particularly, to methods and apparatus to dynamically manage audibly proximate devices during user activities.

BACKGROUND

Laptops and other personal computers are used extensively for audio and video conferencing across the corporate world, for distance learning, and to communicate with friends and loved ones. In many situations, a user will carry around a laptop and a cellular phone. Additionally, in modern offices and homes, it is becoming increasingly common to find smart devices, such as smart switches, smart fans, smart climate control systems, among others.

BRIEF DESCRIPTION OF THE DRAWINGS

FIG. 3 illustrates an example controllable device list for managing controllable devices.

FIG. 5 is a flowchart representative of example machine readable instructions and/or example operations that may be executed and/or instantiated by processor circuitry to manage communications received on mobile devices during user activities that may be executed by example processor circuitry to implement the background sound management circuitry of FIG. 2.

Figure 1:
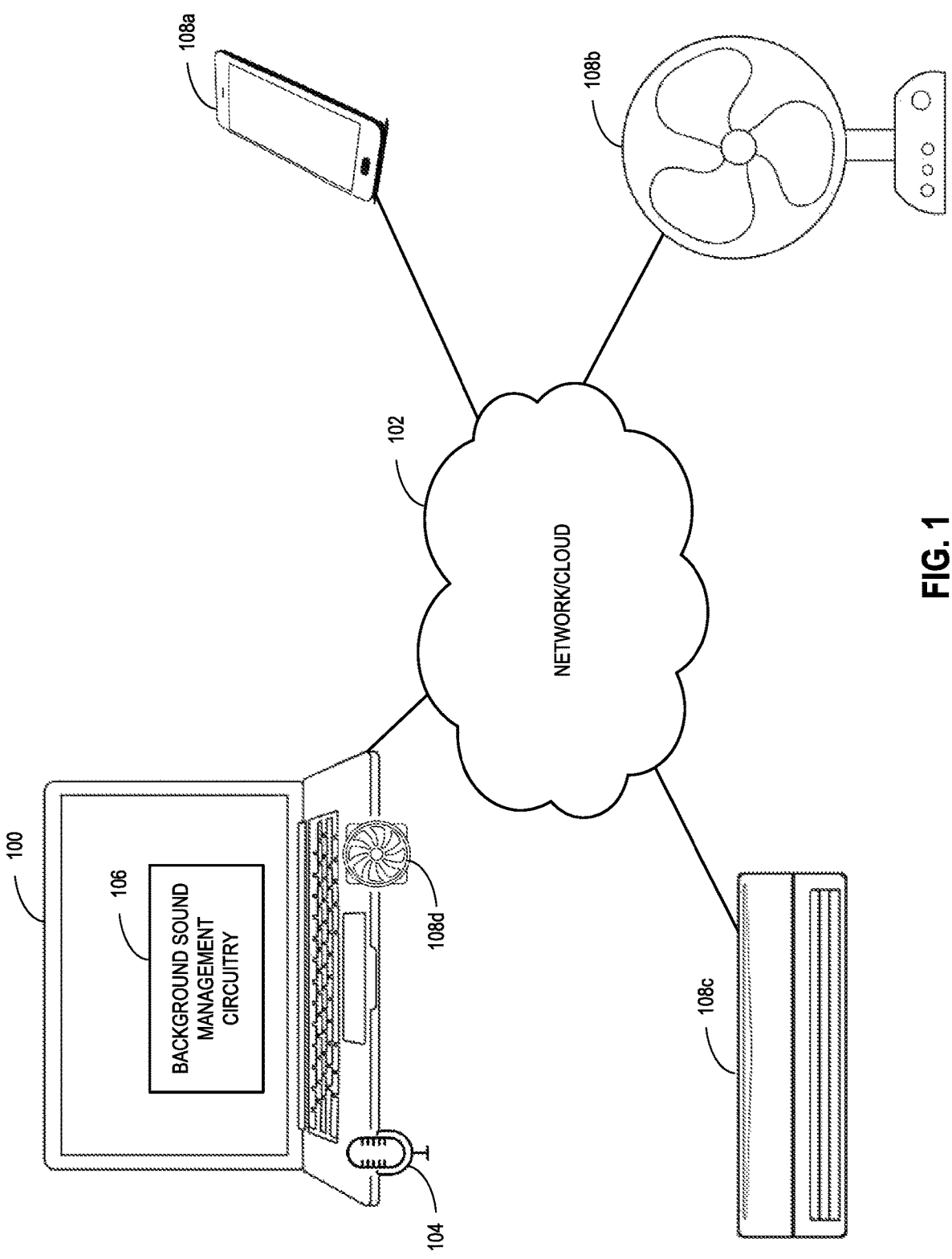
FIG. 1 is an illustration of an example system to manage mobile devices during user activities.

In general, the same reference numbers will be used throughout the drawing(s) and accompanying written description to refer to the same or like parts. The figures are not to scale. Instead, the thickness of the layers or regions may be enlarged in the drawings. Although the figures show layers and regions with clean lines and boundaries, some or all of these lines and/or boundaries may be idealized. In reality, the boundaries and/or lines may be unobservable, blended, and/or irregular.

As used herein, unless otherwise stated, the term "above" describes the relationship of two parts relative to Earth. A first part is above a second part, if the second part has at least one part between Earth and the first part. Likewise, as used herein, a first part is "below" a second part when the first part is closer to the Earth than the second part. As noted above, a first part can be above or below a second part with one or more of: other parts therebetween, without other parts therebetween, with the first and second parts touching, or without the first and second parts being in direct contact with one another.

As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

As used herein, the phrase "in communication" or "communicatively coupled," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmable with instructions to perform specific operations and including one or more semiconductor-based logic devices (e.g., electrical hardware implemented by one or more transistors). Examples of processor circuitry include programmable microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of processor circuitry is/are best suited to execute the computing task(s).

DETAILED DESCRIPTION

People increasingly use mobile computing devices (such as laptops, tablets, cellular phones) to connect with each other. Businesses have employees that work remotely and such employees often join meetings remotely (e.g., audio and/or video conferences) from a number of locations by using such mobile computing devices. Some locations are prone to a significant amount of background sound that may interfere with the audible clarity of a voice from a person participating in an audio/video conference. Background sound may be present due to many different reasons. Some of those reasons include devices that produce sound and are sufficiently close to the microphone designated for capturing a person's voice. For example, a user of a laptop computer who is participating in an audio conference may have his/her cellular phone sitting next to the laptop computer when a call is received, which causes the phone to ring (which is audibly captured by the microphone of the laptop computer). In another example, a desk fan that is next to the user's laptop is powered on and is set to a sufficiently high speed that the airflow passing through the fan blades can be audibly captured by the microphone.

Other noisy devices in and around a laptop may create additional background sound, such as air conditioning units, ceiling fans, CPU cooling fans, smart TVs, etc. To mitigate such background sound, a user may mute the microphone, but that is not ideal when the user is the one talking on a conference call. Alternatively, the user can attempt to lower the volume of some or all of the sound-producing devices, but this may not be practical or may be disruptive during the conference call.

Examples disclosed herein dynamically manage audibly proximate devices during user activities. For example, a mobile device such as a cellular phone may be dynamically managed to reduce or eliminate any sound produced by the cellular phone in an automated way while a user is participating in an audio/video conference. Examples disclosed herein discover devices that can be controlled within an audible proximity to a microphone used in an audio/video conference. For example, a cellular phone may be sitting on a table next to a microphone of a laptop computer that is being used for a conference call. In some examples, the cellular phone is controlled during such a conference call to reduce or eliminate its sounds that could be produced by the cellular phone (e.g., muting a speaker in the cellular phone).

Examples disclosed herein may be used to manage incoming communications to the cellular phone while it is being muted to provide feedback to a person attempting to contact the user via the cellular phone. For example, when an incoming call or text message is received at a receiving cellular phone, and the receiving cellular phone is being dynamically controlled to lower or eliminate any audible indicator, the receiving cellular phone is controlled to send an automated call or text message to the initiating cellular phone indicating that the user is busy and/or a future time that the user will be free (e.g., after the audio/video conference concludes). Examples disclosed herein enable a conference mode at the laptop computer by initiating a queue of incoming communications (e.g., communication inquiries) to store while the user is not to be disturbed during the audio/video conference. Examples disclosed herein may modify one or more functions of a controllable device, such as reduce the speed of a fan, turn off a fan, mute a speaker, reduce the volume of the audio being produced by the speaker, or one or more other functions.

Examples disclosed herein cause a controllable device that is a personal communication device (e.g., a cellular phone or another computer) to transfer communication inquiries received during the audio/video conference to the primary device (e.g., the laptop) for further communication inquiry management. Examples disclosed herein allow a controllable device to return to a normal state (e.g., a state without a modified function to reduce background sound) when the microphone being used to capture the user's voice is muted.

FIG. 1 is an illustration of an example system to manage mobile devices during user activities. In the illustrated example of FIG. 1, a computing device 100 (e.g., a laptop computer, a desktop computer, or any other type of computing device) is present. The example computing device 100 may be operated by a user to interact with other users over a network/cloud 102. In some examples, the computing device 100 may include a user interface that enables the user to have remote audio and/or video conferences/meetings/etc. with other users. In some examples, the network/cloud 102 is a wide area network (WAN) such as the Internet. However, in some examples, the network/cloud 102 may be a local network. Moreover, the example network/cloud 102 may be implemented using any type of public or private network such as, but not limited to, the Internet, a telephone network, a local area network (LAN), a cable network, and/or a wireless network, or any combination thereof.

In the illustrated example, the computing device 100 includes a microphone 104. The example microphone 104 may be an integrated microphone in the computing device (e.g., integrated into a laptop). However, in some examples, the microphone 104 may be a discrete device that plugs into the computing device 100 through a port, such as a Universal Serial Bus (USB) port or a port using another protocol. In some examples, the user interacts audibly with other users in the audio and/or video conference by speaking or creating other audible sounds that are converted from sound waves to electrical signals by the microphone 104.

In the illustrated example, the computing device 100 includes a background sound management circuitry 106. The example background sound management circuitry 106 functions to reduce background sounds that may interfere with the clarity of the conversation between the user and other conference participants during an audio/video conference. The example background sound management circuitry 106 is described in greater detail in connection with FIG. 2 below. In some examples, background sound may otherwise be present during an audio/video conference due to any number of additional devices in audible proximity to the computing device 100. As used herein, "audible proximity" means a distance from the example computing device 100 that is sufficiently close to cause the example microphone 104 to detect or pick up (e.g., convert) secondary sound beyond that of the user's voice (e.g., extra/background sound that may decrease the quality of the user's voice). For example, devices that potentially make sound and that are within an audible proximity to the computing device 100 may include a mobile/cellular phone 108a (e.g., a personal communication device), a fan 108b, and/or an air conditioning unit 108c. Additionally or alternatively, one or more devices within the computing device 100 also may make secondary sound. For example, a central processing unit (CPU) cooling fan 108d may produce secondary/background sound in an audible proximity to the microphone 104. As used herein, "secondary sound" means sound other than the primary sound of a user's voice during an audio/video conference. Additionally, "background sound" may be used interchangeably with "secondary sound."

In some examples, secondary sound coming from a device that is in audible proximity to the microphone 104 may include sound that is produced by a speaker in the sound-producing device. For example, the mobile phone 108a may produce a ringing sound or other audible sound using an internal speaker that is an audible notification/indicator of an incoming phone call or text message, among other events. However, in some examples, secondary sound coming from a sound-producing device that is in audible proximity to the microphone 104 may be produced by mechanical and/or electrical implements that are part of the secondary device. For example, the blades of the fan 108b, the blades of an internal fan within air conditioning unit 108c, or the blades of CPU cooling fan 108d may create the sound of air moving across the blades and/or through air ducts. In other examples, other implements may create secondary sound, such as a metallic sound from the condenser in air conditioning unit 108c, among many other sound-producing possibilities.

In some examples, the sound-producing devices 108a,b, c,d may include electronic control units that cause the speakers, fans, and/or other sound-producing implements to operate. In some examples, such electronic control units may include technology that allows for communication to and from other electronic devices. For example, one or more of the sound-producing devices 108b/c may be "smart" devices that can be remotely controlled by one or more other devices through smart home applications and/or other communication applications.

As used herein, "smart" devices, appliances, switches, climate control systems, etc. are labeled smart because they each include some level of communication to a cloud or network and have function(s) that can be controlled from a remote device. For example, a smart appliance may include an electronic controller to control functions of the appliance as well as a network transceiver or other network interface to enable communications with other devices. The example smart appliance may include an application programming interface (API) or other form of controllable software that enables remote applications/devices to control the smart appliance functions.

In some examples, other sound-producing devices, such as mobile phone 108a and/or CPU cooling fan 108d may include controllers that can enable or disable speakers, fans, and/or other implements. Such controllers may be accessible by other devices for remotely controlled operations. As such, in some examples, sound-producing devices 108a,b,c,d, and more specifically, the sound-producing implements (e.g., components) that are part of such sound-producing devices 108a,b,c,d may be considered controllable devices. As used herein, a "controllable device" means a device that has one or more functions that are capable of being controlled by a remote device (e.g., a device other than control logic within the device that controls itself). For example, the background sound management circuitry 106 may control (e.g. at least temporarily) one or more functions of each of controllable devices 108a,b,c,d. In some examples, the background sound management circuitry 106 may control a function in a controllable device 108a,b,c,d capable of modifying the sound-making sounds. For example, the background sound management circuitry 106 may control the fan speed of a fan (e.g., CPU cooling fan 108d) or the volume of a speaker (e.g., a speaker within mobile phone 108a). As used herein, when referring to any one or more controllable devices, the generic controllable device "108" designation will be used, which is to mean one or more of the example controllable devices 108a, 108b, 108c, 108d, and/or one or more other example controllable devices other than 108a, 108b, 108c, and 108d. If the reference is to a specific example controllable device, the letter designation will be used with the "108" designation (e.g., CPU cooling fan 108d).

Figure 2:
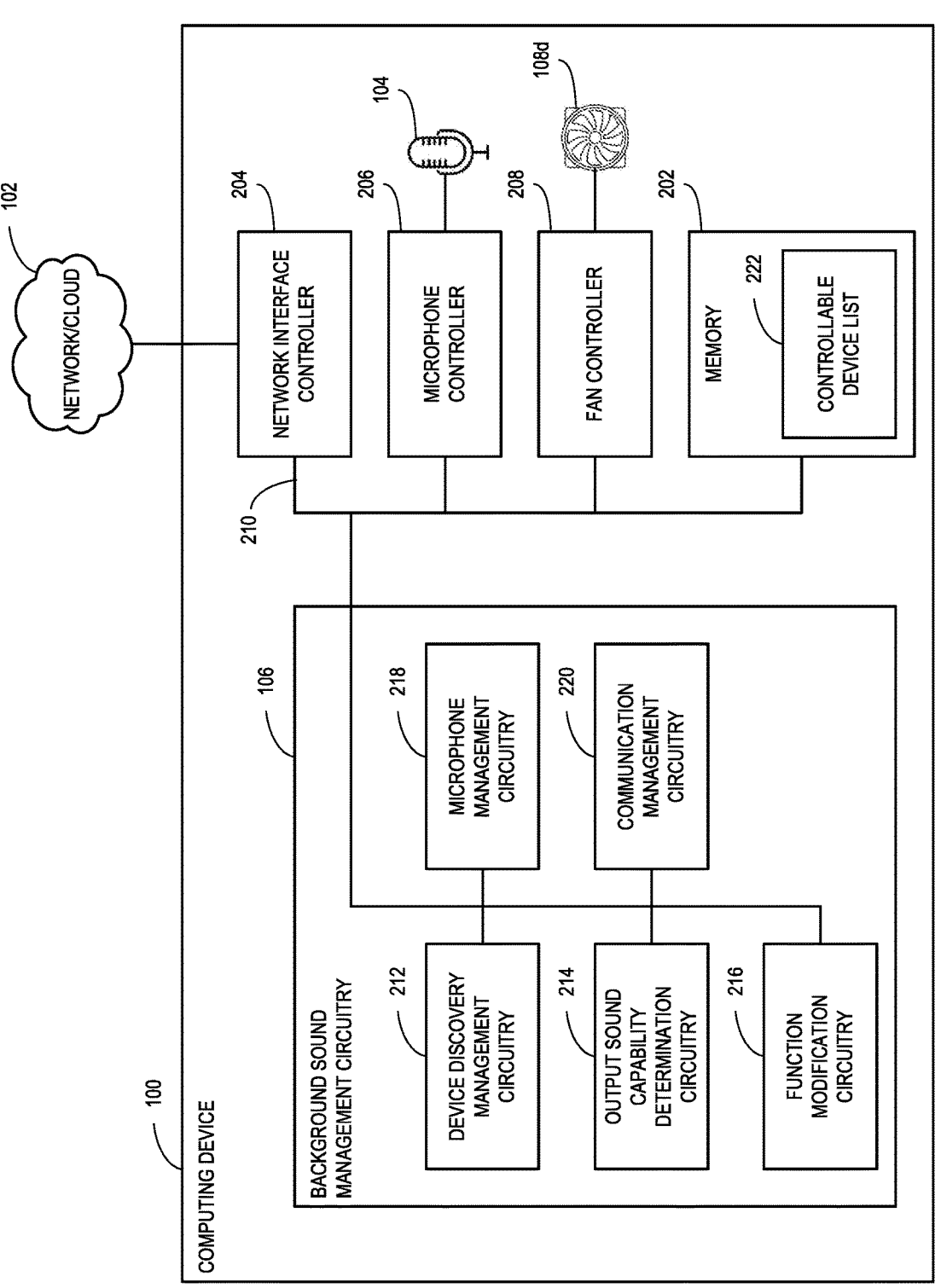
FIG. 2 is a block diagram of the example background sound management circuitry to manage mobile devices during user activities.

FIG. 2 is a block diagram of the example background sound management circuitry 106 to manage mobile devices during user activities. The example background sound management circuitry 106 of FIG. 2 may be instantiated (e.g., creating an instance of, bring into being for any length of time, materialize, implement, etc.) by processor circuitry such as a central processing unit executing instructions. Additionally or alternatively, the example background sound management circuitry 106 of FIG. 2 may be instantiated (e.g., creating an instance of, bring into being for any length of time, materialize, implement, etc.) by an ASIC or an FPGA structured to perform operations corresponding to the instructions. It should be understood that some or all of the circuitry of FIG. 2 may, thus, be instantiated at the same or different times. Some or all of the circuitry may be instantiated, for example, in one or more threads executing concurrently on hardware and/or in series on hardware. Moreover, in some examples, some or all of the circuitry of FIG. 2 may be implemented by one or more virtual machines and/or containers executing on the microprocessor.

In some examples, the background sound management circuitry 106 is included within processor circuitry (e.g., the processor circuitry 712 of FIG. 7) in the computing device 100 (FIG. 1). In the illustrated example, the computing device 100 includes memory 202, network interface controller 204, microphone controller 206 (e.g., to provide functional control of the microphone 102 (FIG. 1)), and fan controller 208 (e.g., to provide functional control of the CPU cooling fan 108d (FIG. 1)).

In the illustrated example, the memory 202 can be physical memory that could include volatile memory (e.g., dynamic random access memory (DRAM), static random access memory (SRAM), etc.), non-volatile memory, buffer memory within processor circuitry, a cache memory, or any one or more other types of memory. In different examples, the network interface controller 204 can include a transmitter, a receiver, a transceiver, a modem, and/or another type of network interface to facilitate exchange of data with external machines (e.g., computing devices of any kind) by network/cloud 102 (FIG. 1).

In the illustrated example, the microphone controller 206 includes circuitry to receive (e.g., obtain) analog sound signals from the microphone 102. The example microphone controller 206 may include an analog to digital converter (ADC) to convert the obtained analog sound signals into a digital signal. In some examples, the microphone controller 206 may additionally include controls to modify the analog input data from the microphone. For example, the microphone controller 206 may be capable of adjusting the sensitivity of the microphone 102 to detect more or less sound. In some examples, the microphone controller 206 includes a functional ability to turn off input from the microphone 102 (e.g., a mute function). In some examples, the microphone controller 206 may receive/obtain instructions and/or signals from background sound management circuitry 106 to perform one or more operations/functions.

In the illustrated example, the fan controller 208 includes circuitry to control the operation of the CPU cooling fan 108d. For example, the fan controller 208 may turn on or turn off the CPU cooling fan 108d and/or increase or decrease the rotations per minute (RPM) of the blades of the CPU cooling fan 108d. In some examples, the fan controller 208 may receive/obtain instructions and/or signals from the background sound management circuitry 106 to perform one or more operations/functions.

In some examples, the computing device 100 also includes an interface 210 (e.g., an interconnect, bus, etc.). The example interface 210 may be implemented by hardware in accordance with any type of interface standard, such as an Ethernet interface, a universal serial bus (USB) interface, a Bluetooth® interface, a near field communication (NFC) interface, a PCI interface, a PCIe interface, and/or one or more other types of interfaces. In some examples, the interface 210 may be a combination of multiple types of interfaces that are communicatively coupled together. In the illustrated example, the memory 202, the network interface controller 204, the microphone controller 206, and the fan controller 208 are connected to the interface 210. The example interface 210 allows information/data to be transmitted between any two or more connected (e.g., communicatively coupled) devices.

In the illustrated example of FIG. 2, the background sound management circuitry 106 includes device discovery management circuitry 212, output sound capability determination circuitry 214, function modification circuitry 216, microphone management circuitry 218, and communication inquiry management circuitry 220. In some examples, some or all of the circuitries 212-220 may be implemented in hardware within processor circuitry 200 (e.g., the processor circuitry 712 of FIG. 7). In some examples, some or all of the circuitries 212-220 may be instantiated in software, running on processor circuitry, as virtual versions of such hardware circuitries, as described below.

In the illustrated example, the background sound management circuitry 106 includes device discovery management circuitry 212. The example device discovery management circuitry 212 discovers a controllable device 108 in audible proximity to the microphone 102. In some examples, the device discovery management circuitry 212 employs one or more device discovery-capable protocols and/or smart appliance management applications to discover such controllable device 108. For example, assuming the computing device 100 is located in a smart home with smart appliances, smart switches, smart climate control systems, and/or other smart devices, the computing device may implement a discovery protocol native to each smart device, over the network/cloud 102. In some examples, the device discovery management circuitry 212 implements such controllable device 108 discovery in a set-up phase prior to implementing further functional aspects of the background sound management circuitry 106.

In some examples, the device discovery management circuitry 212 dynamically discovers controllable devices 108 in an audible proximity to the microphone 104 based on a locality determination between the computing device 100 and one or more controllable devices 108. For example, the computing device 100 and a controllable device 108 may both access the network/cloud 102 from the same wireless router/repeater/hotspot, which may indicate audible proximity. For example, the computing device 100 and a controllable device 108 may both support Bluetooth, Near-Field Communication (NFC), or another short-range wireless standard and have a discovery mode enabled to automatically pair when in range. In some examples, the computing device 100 may support a global positioning system (GPS) or other geo-location standard, which would allow the device discovery management circuitry 212 to set up a geo fence corresponding to a stationary controllable device (e.g., controllable devices 108b,c). For example, the computing device 100, with GPS enabled, may enter a geo-fenced region associated with a controllable device 108b,c, and, as a result, the device discovery management circuitry 212 enables communication with controllable device 108b,c as needed.

In the illustrated example, the device discovery management circuitry 212 may manage a controllable device list 222 (e.g., stored in memory 202). The example device discovery management circuitry 212 may populate the controllable device list 222 with information associated with known controllable devices 108. FIG. 3 illustrates an example controllable device list 222 for managing controllable devices 108. In some examples, for each registered/populated controllable device in the controllable device list 222, a number of items of data may be stored that are associated with the controllable device 108. For example, the data/information stored in the controllable device list 222 may include the controllable device name 300, an IP (Internet Protocol) address 302, function information 304, location information 306, communication inquiry instructions 308, and/or additional information 310 as needed.

The example controllable device name 300 may be the name given to the controllable device 108 by a smart home application, by a user, or by one or more other ways in which devices may be named. The example IP address 302 may be the IP address assigned to the controllable device 108 and utilized by one or more applications and/or the background sound management circuitry 106 to send commands/instructions to control the function(s) of the controllable device 108. The example function information 304 may be a list of functions and/or the APIs used to control such functions. For example, controllable device 108a (e.g., a cellular phone) may have a controllable speaker and the functions listed in the controllable device list 222 for the speaker may include function control to mute/unmute the speaker as well as function control to increase or decrease the volume of the speaker. The example location information 306 may include one or more pieces of information that provide the background sound management circuitry 106 access to the geo-location of the controllable device 108. For example, the location information 306 may include geo-fencing information that would allow the background sound management circuitry 106 an ability to determine whether the computing device 100 is within the geo-fenced region (e.g., within an audible proximity of the controllable device 108). The example communication inquiry instructions 308, may include one or more instructions to be sent to the controllable device 108 for use with management of incoming communication inquiries. Communication inquiry management will be discussed in detail in connection with the communication inquiry management circuitry 222, further below. In some examples, additional information 310 may be stored in the controllable device list 222. For example, the controllable device list 222 may include tested decibel levels of each device at different functional levels (modified through the function information 304), to provide additional details as to how much a function may need to be modified to achieve a needed change in the level of background sound. In some examples, the device discovery management circuitry initializes and maintains the information (described above) in the controllable device list 222.

Figure 4:
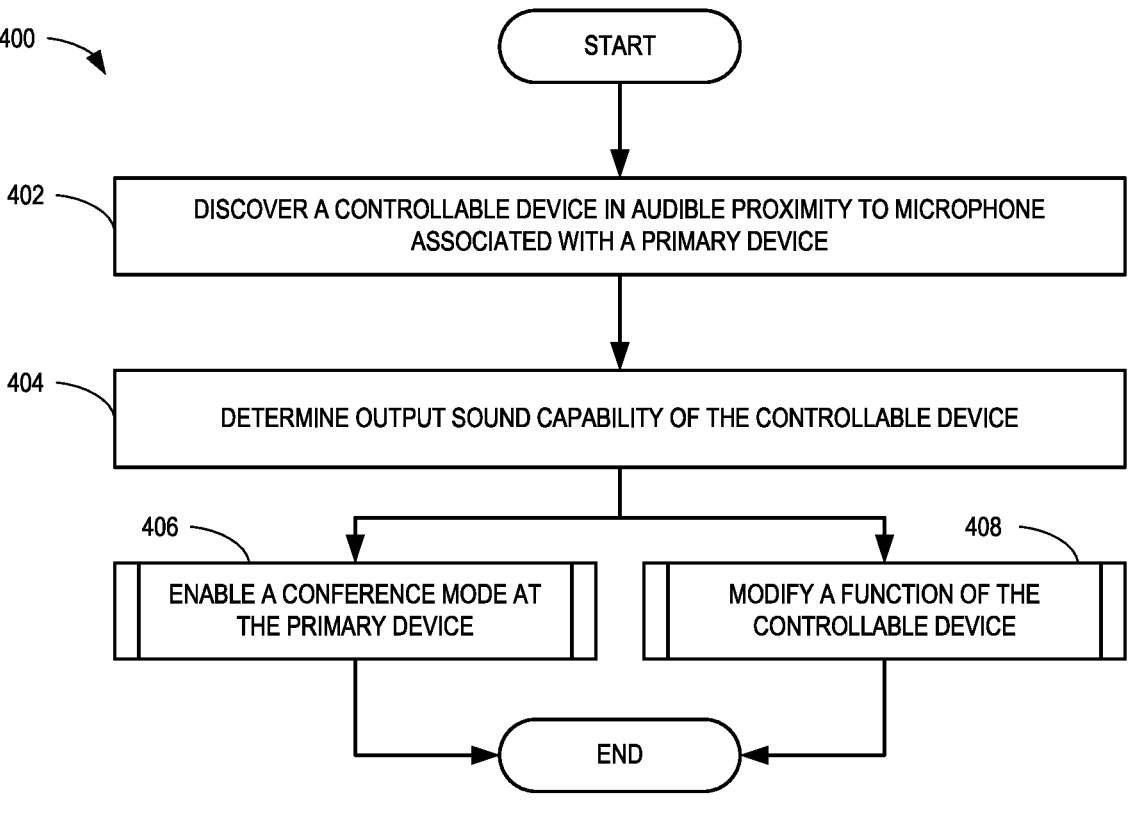
FIG. 4 is a flowchart representative of example machine readable instructions and/or example operations that may be executed and/or instantiated by processor circuitry to dynamically manage audibly proximate devices during user activities that may be executed by example processor circuitry to implement the background sound management circuitry of FIG. 2.

In some examples, the device discovery management circuitry 212 is instantiated by processor circuitry executing device discovery management circuitry 212 instructions and/or configured to perform operations such as those represented by the flowchart of FIG. 4.

In some examples, the background sound management circuitry 106 includes means for discovering a controllable device in audible proximity to a microphone. For example, the means for discovering may be implemented by the device discovery management circuitry 212. In some examples, the device discovery management circuitry 212 may be instantiated by processor circuitry such as the example processor circuitry 712 of FIG. 7. For instance, the device discovery management circuitry 212 may be instantiated by the example microprocessor 800 of FIG. 8 executing machine executable instructions such as those implemented by at least block 402 of FIG. 4 In some examples, the device discovery management circuitry 212 may be instantiated by hardware logic circuitry, which may be implemented by an ASIC, XPU, or the FPGA circuitry 900 of FIG. 9 structured to perform operations corresponding to the machine readable instructions. Additionally or alternatively, the device discovery management circuitry 212 may be instantiated by any other combination of hardware, software, and/or firmware. For example, the device discovery management circuitry 212 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In the illustrated example of FIG. 2, the background sound management circuitry 106 includes output sound capability determination circuitry 214. The example output sound capability determination circuitry 214 determines an output sound capability of the controllable device 108. For example, the output sound capability determination circuitry 214 may look up a controllable device 108 in the controllable device list 222 and determine the output sound capabilities by accessing the associated output sound capabilities data 310 for the controllable device 108 in question. In some examples, the output sound capability determination circuitry 214 may determine a sound type and/or decibel level from the controllable device list 222. In some examples, the sound type may be designated as a mechanically-produced sound (e.g., air rushing through a duct based on fan blade speed) or speaker-produced sound (e.g., a notification sound, such as a ring, produced from a speaker). In some examples, the decibel level may include a highest decibel level produced from the sound-producing implement (e.g., the fan, speaker, etc.). In some examples, the decibel level may have a saved set of decibel levels corresponding to one or more of the functions listed in the function(s) information portion of the controllable device list 222. For example, a fan device may include three speed settings, each of which, may produce a specific decibel level of sound.

The example output sound capability determination circuitry 214 may determine a decibel range of the controllable device 108 by testing a range of the function of the controllable device 108. For example, the output sound capability determination circuitry 214 may employ the function modification circuitry 216 and the microphone management circuitry 218 (both described in greater detail below), to test the decibel range of the controllable device 108. The example output sound capability determination circuitry 214 may first implement the function modification circuitry 216 to cause the controllable device 108 to operate at a range of functional settings (e.g., a range of volume settings for a speaker, a range of fan speeds for a fan). The example output sound capability determination circuitry 214 may then implement the microphone management circuitry 218 to record the output sound of the controllable device 108 at each setting level (e.g., volume level, fan speed level, etc.) and determine the decibel level of the sound the controllable device 108 is generating. The example output sound capability determination circuitry 214 may then save the determined decibel level(s) for the setting level(s) in the controllable device list 222. In some examples, the output sound capability determination circuitry 214 instead passively tests the decibel level of the controllable device 108 by determining decibel level(s) of function(s) of the controllable device 108 as the controllable device 108 is operating normally. In passive testing mode, the example output sound capability determination circuitry 214 does not control the function of the controllable device 108.

In some examples, the output sound capability determination circuitry 214 is instantiated by processor circuitry executing output sound capability determination circuitry 214 instructions and/or configured to perform operations such as those represented by the flowchart of FIG. 4.

In some examples, the background sound management circuitry 106 includes means for determining the output sound capability of a controllable device 108. For example, the means for determining the output sound capability may be implemented by the output sound capability determination circuitry 214. In some examples, the output sound capability determination circuitry 214 may be instantiated by processor circuitry such as the example processor circuitry 712 of FIG. 7. For instance, the output sound capability determination circuitry 214 may be instantiated by the example microprocessor 800 of FIG. 8 executing machine executable instructions such as those implemented by at least block 404 of FIG. 4 In some examples, the output sound capability determination circuitry 214 may be instantiated by hardware logic circuitry, which may be implemented by an ASIC, XPU, or the FPGA circuitry 900 of FIG. 9 structured to perform operations corresponding to the machine readable instructions. Additionally or alternatively, the output sound capability determination circuitry 214 may be instantiated by any other combination of hardware, software, and/or firmware. For example, the output sound capability determination circuitry 214 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the means for determining is also to test the controllable device 108 function(s). In some examples, the means for determining is also to implement the function modification circuitry 216 and/or to implement the microphone management circuitry 218.

In the illustrated example of FIG. 2, the background sound management circuitry 106 includes function modification circuitry 216. The example function modification circuitry 216 modifies a function of the controllable device 108. For example, the function modification circuitry 216 may send a signal or an instruction to the controllable device 108 to cause the controllable device 108 to modify one or more of its functions. For example, the function modification circuitry 216 may send a signal to the controllable device 108 to cause the controllable device 108 to initiate a silent mode of operation. As used herein, a "signal" can be any form of communication sent between devices or between functional blocks within devices. For example, a signal may be an electrical signal transmitted on an electrical line with a nominal voltage to indicate a value. For example, a signal may be information communicated over a network (e.g., network/cloud 102) in a data packet. In some examples, the silent mode of operation includes a configurable profile that can be loaded and run by the controllable device 108 to cause a group of one or more settings in the controllable device 108 to be implemented. For example, a setting in a controllable device 108 may be a volume level for the output of a speaker (e.g., volume level 2 in an range of volume level 0 to 10). For example, a setting in a controllable device 108 may be a fan speed of a fan (e.g., fan speed slow (or fan speed 1) among a range of fan speeds off, slow, medium, fast (or fan speeds 0, 1, 2, 3)). In some examples, any other number of volume levels or fan speeds may be implemented in a range of settings. In some examples, other types of settings may be implemented, such as a level of electrical current flow provided to a device, or one or more other types of settings.

For certain types of settings, the example function modification circuitry 216 may determine whether the setting is allowed to be modified. For example, the CPU cooling fan 108d may produce an airflow sound of a certain decibel level which would be desirable to be reduced to manage background sound registered on the microphone 104. However, in some examples, the CPU cooling fan 108d may provide a cooling function for a CPU (e.g., a thermally-cooled device) in the computing device 100 that supersedes any background sound reduction function. In some examples, the function modification circuitry 216 may determine whether a current thermal condition of the thermally-cooled device satisfies a function modification threshold. For example, the thermal condition may be a thermal design temperature on the surface of the CPU package of 100 degrees Celsius, where any measured temperature on the surface of the CPU package below 100 degrees Celsius satisfies the function modification threshold.

In some examples, when the function modification threshold is satisfied (e.g., the measured temperature is below 100 degrees Celsius), then the function modification circuitry 216 may proceed to cause the function of the controllable device to be modified (e.g, signal to the fan controller 208 to reduce the CPU cooling fan 108d speed or turn off the CPU cooling fan 108d). Alternatively, if the function modification threshold is not satisfied (e.g., the measured temperature is at or above 100 degrees Celsius), then the function modification circuitry 216 may temporarily prohibit any modification of the function. For example, reducing the CPU cooling fan 108d speed or turning it off can considered a function that may be prevented from being modified. In some examples, this may be a temporary prohibition because the desire to reduce background sound may continue throughout an audio conference and the measured temperature of the surface of the CPU package (e.g., the thermally-cooled device) may change as a result of the workload the CPU is executing, as a result of the effectiveness of the cooling solution for the CPU, or otherwise. In some examples, the current thermal condition of the CPU or other thermally-cooled device may be regularly measured, which may change whether the function modification threshold is satisfied over time, causing the function modification circuitry 216 to potentially alternate between modifying and not modifying the function of the controllable device (e.g., CPU cooling fan 108d). Alternatively, in some examples, the temperature of a thermally-cooled device may be measured in other locations (e.g., on the silicon die of the thermally-cooled device, in ambient air near the thermally-cooled device, etc.). In some examples, the function modification circuitry 216 may determine if a thermally-cooled device associated with a function of a controllable device 108 is present. For example, if there is no thermally-cooled device that utilizes a cooling mechanism to regulate its temperature, the function modification circuitry 216 may not require regular measurement, which may reduce one or more necessary monitoring requirements (e.g., by the function modification circuitry 216).

In some examples, if the modification of the function is temporarily prohibited, the function modification circuitry 216 may store a function modification action until the function modification threshold is again satisfied. Then, at a time the function modification threshold is satisfied, the function modification circuitry 216 may perform the function modification action if the audio/video conference event is still active.

In some examples, the function modification circuitry 216 may reduce the output sound capability of the controllable device 108 by causing a decibel level of an output sound of the controllable device to be reduced. For example, the function modification circuitry 216 may send a signal to the controllable device (e.g., the cellular phone 108a) to cause the controllable device to reduce the volume level of the speaker. In some examples, the controllable device 108 may include a speaker that has volume levels 0-10 and the function modification circuitry 216 may send a signal that causes the controllable device 108 to reduce the volume level to 2 (or another low volume level) if the current volume level is above 2. Alternatively, the function modification circuitry 216 may send a signal that prevents activation (e.g., prohibits activation) of the function of the controllable device 108. For example, a speaker in a controllable device 108 functions to make sounds/sound and the function modification circuitry 216 may prevent that function (or prevent an activation of such function). In other words, in some examples, the function modification circuitry 216 may send a signal to the controllable device 108 to cause the controllable device 108 to mute the speaker (e.g., volume level 0).

The example function modification circuitry 216 may unmodify one or more functions of the controllable device 108 once modification is no longer necessary. For example, when an audio/video conference concludes, the function modification circuitry 216 may send a signal to a controllable device 108 to cause the controllable device 108 to return to its normal functions without any modification.

Figure 6:
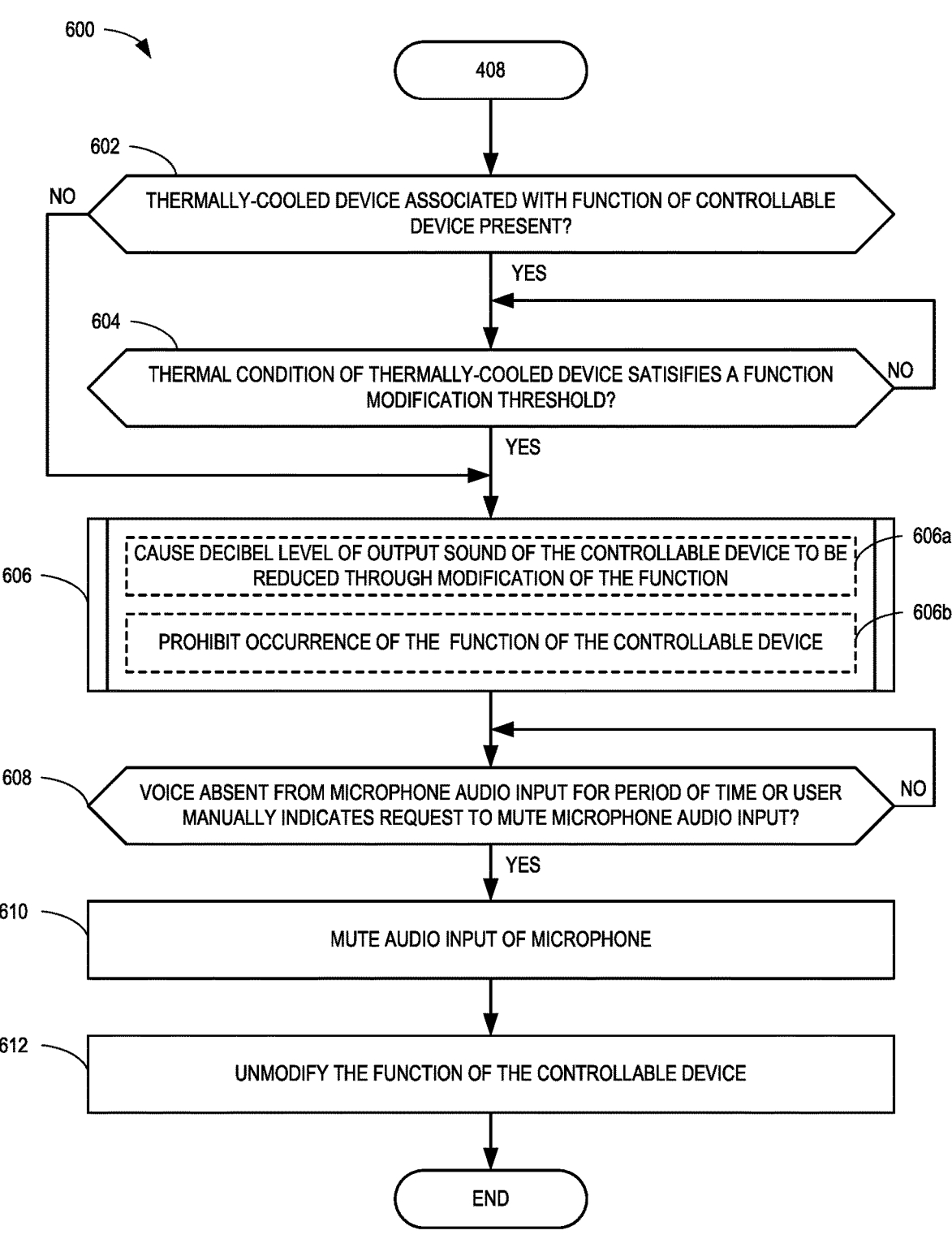
FIG. 6 is a flowchart representative of example machine readable instructions and/or example operations that may be executed and/or instantiated by processor circuitry to manage background sounds during user activities that may be executed by example processor circuitry to implement the background sound management circuitry of FIG. 2.

In some examples, the function modification circuitry 216 is instantiated by processor circuitry executing function modification circuitry 216 instructions and/or configured to perform operations such as those represented by the flowcharts of FIGS. 4, 5, and 6.

In some examples, the background sound management circuitry 106 includes means for modifying a function of a controllable device. For example, the means for modifying may be implemented by the function modification circuitry 216. In some examples, the function modification circuitry 216 may be instantiated by processor circuitry such as the example processor circuitry 712 of FIG. 7. For instance, the function modification circuitry 216 may be instantiated by the example microprocessor 800 of FIG. 8 executing machine executable instructions such as those implemented by at least blocks 408 of FIG. 4 and In some examples, the function modification circuitry 216 may be instantiated by hardware logic circuitry, which may be implemented by an ASIC, XPU, or the FPGA circuitry 900 of FIG. 9 structured to perform operations corresponding to the machine readable instructions. Additionally or alternatively, the function modification circuitry 216 may be instantiated by any other combination of hardware, software, and/or firmware. For example, the function modification circuitry 216 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the means for modifying is also to send a signal to a controllable device 108. In some examples, the means for modifying is also to determine whether a thermally-cooled device associated with a function of a controllable device 108 is present. In some examples, the means for modifying is also to determine if a thermal condition of a thermally-cooled device satisfies a function modification threshold. In some examples, the means for modifying is also to cause a decibel level of output sound of the controllable device 108 to be reduced through a modification of a function of the controllable device 108. In some examples, the means for modifying is also to prohibit an occurrence of a function of the controllable device 108. In some examples, the means for modifying is also to unmodify the function of a controllable device.

In the illustrated example of FIG. 2, the background sound management circuitry 106 includes microphone management circuitry 218. The example microphone management circuitry 218 detects whether there is an absence of a voice as audio input to the microphone 102. For example, a conference mode may be enabled on the primary device and, when in the conference mode, the microphone management circuitry 218 may receive audio information from the microphone controller 206 (which receives audible sound from the microphone 104). In some examples, the microphone management circuitry 218 includes logic to detect a voice of a user from the audible sound. In some examples, the microphone management circuitry 218 may also detect the absence of the user's voice for a period of time (e.g., 10 seconds, one minute, five minutes, etc.).

In some examples, after the designated period of time in which the user's voice is not detected, the microphone management circuitry 218 mutes the microphone 104. As used herein, to "mute" the microphone means to disable use of audio information obtained by the microphone 104. For example, by disabling use of the audio information, the microphone controller 206 may not send audio information to any other functional blocks within the computing device 100. In some examples, the user manually may enable the mute function of the microphone.

In some examples, when the microphone is muted, the microphone management circuitry 218 sends a signal to the function modification circuitry 216 indicating the microphone is muted. In some examples, the signal sent from the microphone management circuitry 218 to the function modification circuitry 216 causes the function modification circuitry 216 to unmodify a function of the controllable device 108 that was previously modified. For example, when the user mutes the microphone or when a user stops speaking for a period of time, the function modification circuitry 216 causes the controllable device 108 to return to the unmodified state by sending a signal indicating the function of the controllable device 108 may return to a normal (e.g., unmodified) state.

In some examples, the microphone management circuitry 218 may enable the use of audio information by an "unmute" function, effectively undoing the muting function. Additionally, in some examples, the microphone management circuitry 218 may unmute the microphone 104 when the user's voice is detected. For example, when the microphone is automatically muted based on a designated period of time elapsing where no user voice is detected, such an automatic muting function may be automatically unmuted once the user's voice is detected again. In some examples, the user voice detection mechanism leading to an unmute may be faster than is humanly discernable, leading to a minimal amount of muted speech from the user (e.g., <10 ms). In some examples, the designated period of time may be configurable by the user or by another entity.

In some examples, the microphone management circuitry 218 is instantiated by processor circuitry executing microphone management circuitry 218 instructions and/or configured to perform operations such as those represented by the flowchart of FIG. 6.

In some examples, the background sound management circuitry 106 includes means for muting the audio input of a microphone. For example, the means for muting may be implemented by the microphone management circuitry 218. In some examples, the microphone management circuitry 218 may be instantiated by processor circuitry such as the example processor circuitry 712 of FIG. 7. For instance, the function modification circuitry 216 may be instantiated by the example microprocessor 800 of FIG. 8 executing machine executable instructions such as those implemented by at least blocks 608 and 610 of FIG. 6. In some examples, the microphone management circuitry 218 may be instantiated by hardware logic circuitry, which may be implemented by an ASIC, XPU, or the FPGA circuitry 900 of FIG. 9 structured to perform operations corresponding to the machine readable instructions. Additionally or alternatively, the microphone management circuitry 218 may be instantiated by any other combination of hardware, software, and/or firmware. For example, the microphone management circuitry 218 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the means for muting is also to unmute the microphone. In some examples, the means for muting is also to detect the absence of a voice as audio input into a microphone. In some examples, the means for muting is also to detect the presence of a voice as audio input into a microphone.

In the illustrated example of FIG. 2, the background sound management circuitry 106 includes communication management circuitry 220. The example communication management circuitry 220 enables a conference mode at a computing device 100 (e.g., a primary device). As used herein, when a user employs the computing device 100 for an audio/video conference, the computing device 100 may be referred to as a "primary device" for the audio/video conference. In some examples, the communication management circuitry 220 manages communication inquiries for the user during the audio/video conference. As used herein, a "communication inquiry" is an attempted communication to the user by another entity through any electronic communication method (e.g., an email, a phone call, a text message, etc.). Communication inquiries may be received by the example computing device 100 via the network/cloud 102 and/or may be received by one or more example controllable devices 108. In some examples, the communication management circuitry 220 initiates a primary device communication inquiry queue. For example, one or more communication inquiries may be received by the primary device (e.g., the computing device 100) during an audio/video conference and the communication management circuitry 220 may queue such received communication inquiries to be provided to the user upon the conclusion of the audio/video conference. In some examples, the communication inquiries may initially be received by a controllable device 108 and then forwarded to the primary device/computing device 100. In some examples, when the primary device/computing device 100 is engaged in driving one or more applications, such as a video/audio conference with an unmuted microphone, the controllable device 108 may send information such that provides additional context to the primary device 100, such as "received urgent call, critical alert SMS (short message service). In some examples, the primary device 100 will provide a visual notification to the user on the display (e.g., show a message or icon indicating the urgent call, etc. was received and user attention may be needed).

In some examples, a communication inquiry (e.g., a phone call) is received at a controllable device 108, such as the cellular phone controllable device 108a. In some examples, the communication management circuitry 220 may send a communication (e.g., a data packet, a signal, etc.) to the cellular phone controllable device 108a to cause the cellular phone controllable device 108a to load a configurable profile associated with an audio/video conference event. In such examples, the communication management circuitry 220 may cause the cellular phone controllable device 108a, through the loaded profile, to provide a user busy reply to a communication inquiry received at the cellular phone 108a. Furthermore, in some examples, the communication management circuitry 220 may also cause the cellular phone controllable device 108a, through the loaded profile, to transfer such a received communication inquiry to the primary device/computing device 100.

The example communication management circuitry 220 may receive (e.g., obtain) the transferred communication inquiry from the cellular phone controllable device 108a and determine whether the received communication inquiry satisfies a priority level threshold. For example, communication inquiries may have priority levels based on the person or entity that initiated the communication inquiry (e.g., a user's manager, an executive of a user's company, a user's family member, etc.). In some examples, the user may set priority levels of contacts to be used in such determinations. In some examples, the person/entity attempting to contact the user through the communication inquiry may be allowed to set a priority level of such communication inquiry (e.g., a priority level functionality of an email or of a voice mail).

The example communication management circuitry 220 may determine if the communication inquiry satisfies a priority level threshold. For example, a communication inquiry may have a low, medium, or high priority level and the priority level threshold may be the high priority level designation. In other examples, any number of priority levels may be implemented. In some examples, if the communication inquiry priority level satisfies the priority level threshold (e.g., the communication inquiry priority level is high and the priority level threshold is medium), then the communication management circuitry 220 provides an indicator of the communication inquiry on the primary device/computing device 100. For example, during the audio/video conference, the communication inquiry indicator may be a silent but visible pop-up window in a corner of the screen informing the user of the received communication inquiry. If the communication inquiry priority level does not satisfy the priority level threshold (e.g., the communication inquiry priority level is low and the priority level threshold is high), then the communication management circuitry 220 does not provide an indicator of the communication inquiry on the primary device/computing device 100. In such situations, the example communication management circuitry 220 may add the received communication inquiry to the initiated primary device communication inquiry queue. In some examples, the communication management circuitry 220 may provide the user the communication inquiries received and queued in the primary device communication inquiry queue after the conclusion of the audio/video conference. In some examples, the primary device communication inquiry queue may store one or both of communication inquiries that are received from third parties across the network/cloud 102 and/or communication inquiries transferred from one or more controllable devices 108.

The example communication management circuitry 220 disables the conference mode at the primary device at the conclusion of the audio/video conference. In some examples, the communication management circuitry 220 disables the conference mode by flushing the primary device communication inquiry queue once the user has been provided the communication inquiries stored in the primary device communication inquiry queue. In some examples, the communication management circuitry 220 disables the conference mode by sending a signal or other form of communication to the controllable device 108 to return to normal operations (e.g., discontinue causing the controllable device 108 to provide the user a busy reply to communication inquiries and/or discontinue causing the controllable device 108 to transfer communication inquiries to the primary device/computing device 100). In some examples, the signal sent to the controllable device 108 to return to normal operations causes the controllable device 108 to load a standard profile for its functions (e.g., a non audio/video conference profile).

In some examples, the communication management circuitry 220 is instantiated by processor circuitry executing communication management circuitry 220 instructions and/or configured to perform operations such as those represented by the flowchart of FIG. 5.

In some examples, the background sound management circuitry 106 includes means for enabling a conference mode at the primary device. For example, the means for enabling may be implemented by the communication management circuitry 220. In some examples, the communication management circuitry 220 may be instantiated by processor circuitry such as the example processor circuitry 712 of FIG. 7. For instance, the communication management circuitry 220 may be instantiated by the example microprocessor 800 of FIG. 8 executing machine executable instructions such as those implemented by at least blocks 504, 506, 508, 510, and 512 of FIG. 5. In some examples, the communication management circuitry 220 may be instantiated by hardware logic circuitry, which may be implemented by an ASIC, XPU, or the FPGA circuitry 900 of FIG. 9 structured to perform operations corresponding to the machine readable instructions. Additionally or alternatively, the communication management circuitry 220 may be instantiated by any other combination of hardware, software, and/or firmware. For example, the communication management circuitry 220 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the means for enabling is also to initiate a primary device communication inquiry queue. In some examples, the means for enabling is also to cause a controllable device 108 to provide a user busy reply to a communication inquiry received at the controllable device 108. In some examples, the means for enabling is also to cause a controllable device 108 to transfer communication inquiries received at the controllable device 108 to the primary device/computing device 100. In some examples, the means for enabling is also to determine if a received communication inquiry satisfies a threshold priority level.

While an example manner of implementing the background sound management circuitry 106 of FIG. 1 is illustrated in FIG. 2, one or more of the elements, processes, and/or devices illustrated in FIG. 2 may be combined, divided, re-arranged, omitted, eliminated, and/or implemented in any other way. Further, the example device discovery management circuitry 212, the example output sound capability determination circuitry 214, the example function modification circuitry 216, the example microphone management circuitry 218, the example communication management circuitry 220, and/or, more generally, the example background sound management circuitry 106 of FIG. 1, may be implemented by hardware alone or by hardware in combination with software and/or firmware. Thus, for example, any of the example device discovery management circuitry 212, the example output sound capability determination circuitry 214, the example function modification circuitry 216, the example microphone management circuitry 218, the example communication management circuitry 220, and/or, more generally, the example background sound management circuitry 106, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device (s) (FPLD(s)) such as Field Programmable Gate Arrays (FPGAs). Further still, the example background sound management circuitry 106 of FIG. 1 may include one or more elements, processes, and/or devices in addition to, or instead of, those illustrated in FIG. 2, and/or may include more than one of any or all of the illustrated elements, processes and devices.

Flowcharts representative of example hardware logic circuitry, machine readable instructions, hardware implemented state machines, and/or any combination thereof for implementing the background sound management circuitry 106 of FIG. 2 are shown in FIGS. 4-6. The machine readable instructions may be one or more executable programs or portion(s) of an executable program for execution by processor circuitry, such as the processor circuitry 712 shown in the example processor platform 700 discussed below in connection with FIG. 7 and/or the example processor circuitry discussed below in connection with FIGS. 8 and/or 9. The program(s) may be embodied in software stored on one or more non-transitory computer readable storage media such as a compact disk (CD), a floppy disk, a hard disk drive (HDD), a solid-state drive (SSD), a digital versatile disk (DVD), a Blu-ray disk, a volatile memory (e.g., Random Access Memory (RAM) of any type, etc.), or a non-volatile memory (e.g., electrically erasable programmable read-only memory (EEPROM), FLASH memory, an HDD, an SSD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN)) gateway that may facilitate communication between a server and an endpoint client hardware device). Similarly, the non-transitory computer readable storage media may include one or more mediums located in one or more hardware devices. Further, although the example program(s) is/are described with reference to the flowcharts illustrated in FIGS. 4-6, many other methods of implementing the example background sound management circuitry 106 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU, an XPU, etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIGS. 4-6 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium, non-transitory computer readable storage medium, non-transitory machine readable medium, and non-transitory machine readable storage medium are expressly defined to include any type of computer readable storage device and/or storage disk and to exclude propagating signals and to exclude transmission media. As used herein, the terms "computer readable storage device" and "machine readable storage device" are defined to include any physical (mechanical and/or electrical) structure to store information, but to exclude propagating signals and to exclude transmission media. Examples of computer readable storage devices and machine readable storage devices include random access memory of any type, read only memory of any type, solid state memory, flash memory, optical discs, magnetic disks, disk drives, and/or redundant array of independent disks (RAID) systems. As used herein, the term "device" refers to physical structure such as mechanical and/or electrical equipment, hardware, and/or circuitry that may or may not be configured by computer readable instructions, machine readable instructions, etc., and/or manufactured to execute computer readable instructions, machine readable instructions, etc.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

FIG. 4 is a flowchart representative of example machine readable instructions and/or example operations 400 that may be executed and/or instantiated by processor circuitry to dynamically manage audibly proximate devices during user activities. The machine readable instructions and/or the operations 400 of FIG. 4 begin at block 402, at which the example device discovery management circuitry 212 (FIG.

2) discovers a controllable device 108 (FIGS. 1 and 2) in audible proximity to a microphone 104 (FIGS. 1 and 2) associated with a primary device (e.g., the computing device 100 of FIGS. 1 and 2). In some examples, discovery includes accessing the controllable device list 222 (FIG. 2) that has information associated with one or more controllable devices 108. In some examples, discovery includes dynamically discovering one or more controllable devices 108 in an audibly proximate area through one or more discovery methods, as described above.

At block 404, the output sound capability determination circuitry 214 (FIG. 2) determines the output sound capability of the controllable device 108. In some examples, the output sound capabilities of a controllable device 108 may need to be determined in a first pass through the flowchart of FIG. 4, but then block 404 may be skipped during subsequent iterations if such output sound capabilities were previously determined by the output sound capability determination circuitry 214 prior to a current audio/video conference or during a previous audio/video conference setup/initiation.

At block 406, the communication management circuitry 220 (FIG. 2) enables a conference mode at the primary device/computing device 100. The functions performed in block 406 are described in greater detail below in connection with FIG. 5.

At block 408, the function modification circuitry 216 (FIG. 2) modifies a function of the controllable device 108. The functions performed in block 408 are described in greater detail below in connection with FIG. 6.

In some examples, blocks 406 and 408 are not dependent on each other to be functionally performed. Thus, in some examples, the chronological times that operations are performed related to blocks 406 and 408 may overlap. After blocks 406 and/or 408 are completed, the machine readable instructions and/or operations of FIG. 4 end.

FIG. 5 is a flowchart representative of example machine readable instructions and/or example operations 500 that may be executed and/or instantiated by processor circuitry to manage communications received on mobile devices during user activities. In some examples, the machine readable instructions and/or the operations 500 of FIG. 5 can be executed and/or instantiated by processor circuitry to implement block 406 of the machine readable instructions and/or the operations 400 of FIG. 4.

The machine readable instructions and/or the operations 500 of FIG. 5 begin at block 502, at which the example function modification circuitry 216 (FIG. 2) sends a signal to a controllable device 108 (FIGS. 1 and 2) to cause a silent mode of operation. In some examples, the silent mode of operation includes causing the controllable device 108 to discontinue producing sounds from one or more mechanical and/or electrical implements (e.g., such as fans and/or speakers, among other possible sound-producing implements).

At block 504, the example communication management circuitry 220 (FIG. 2) initiates a primary device communication inquiry queue. In some examples, such a queue is set up in a memory (e.g., the memory 202 of FIG. 2) a storage device (e.g., a mass storage 728 of FIG. 7, discussed below), or in a local memory such as a buffer, register, or cache memory (e.g., a local memory 713 of FIG. 7, discussed below). In some examples, the primary device communication inquiry queue receives and stores communication inquiries received from the network/cloud 102 (FIGS. 1 and 2) via the network interface controller 204 (FIG. 2) and/or received as communication inquiry transfers from a controllable device 108.

At block 506, the example communication management circuitry 220 causes a controllable device 108 to provide a "user busy" reply to a third party/entity that generated/sent a communication inquiry, which was received at the controllable device 108. At block 508, the example communication management circuitry 220 causes a controllable device 108 to transfer to the primary device/computing device 100 a communication inquiry received at the controllable device 108. In some examples, blocks 506 and 508 are caused by the communication management circuitry 220 sending a signal or other form of communication to the controllable device 108, which causes the controllable device 108 to load a profile that includes configuration parameters that modify one or more functions the controllable device 108 performs (or one or one or more devices perform that are associated with the controllable device 108, such as a speaker or a fan).

At block 510, the example communication management circuitry 220 queues a received communication inquiry. In some examples, the communication inquiry is received (e.g., obtained) from the network/cloud 102 via network interface controller 204 (FIG. 2). In some examples, the communication inquiry is received from the controllable device 108.

At block 512, the example communication management circuitry 220 determines whether the received communication inquiry satisfies a priority threshold level. In some examples, the priority threshold level may be stored in memory (e.g., in a configuration file). In some examples, the priority threshold level is selected by a person based on a relationship type or relationship level of the sender of the communication inquiry to the person. For example, a family member of the person (e.g., the user of the controllable device 108) may be designated a highest priority level. For example, a work manager of the person may be designated a second highest priority level. For example, an unknown sender of the communication inquiry may be designated a low priority level. If the priority level of the received communication inquiry satisfies the priority threshold level (e.g., the designated priority level of the communication inquiry is at or above the threshold priority level), then at block 514, the example communication management circuitry 220 provides an indicator of the communication inquiry on the primary device/computing device 100. Otherwise, if the received communication inquiry does not satisfy a priority threshold level, then no indicator is provided. After block 514 is completed, the machine readable instructions and/or operations of FIG. 5 end.

FIG. 6 is a flowchart representative of example machine readable instructions and/or example operations 600 that may be executed and/or instantiated by processor circuitry to manage background sounds during user activities. In some examples, the machine readable instructions and/or the operations 600 of FIG. 6 can be executed and/or instantiated by processor circuitry to implement block 408 of the machine readable instructions and/or the operations 400 of FIG. 4.

The machine readable instructions and/or the operations 600 of FIG. 6 begin at block 602, at which the example function modification circuitry 216 (FIG. 2) determines whether a thermally-cooled device associated with a function of a controllable device 108 (FIGS. 1 and 2) is present. For example, the function modification circuitry 216 may determine if a sound-producing function of a controllable device 108 also provides a critical cooling function for a thermally-cooled device, such as a CPU-cooling fan 108*d* cooling a CPU of a controllable device 108. In some examples, the fan controller 208 (FIG. 2) and the fan 108*d*

(FIGS. 1 and 2) are considered a controllable device even though they are within the primary device/computing device 100 (FIGS. 1 and 2). In some examples, another thermally-cooled device, such as a CPU in a second computing device discrete from the primary device/computing device 100 is present and in audible proximity to the primary device/computing device 100.

If there is not a thermally-cooled device present that is associated with a function of the controllable device 108, then block 604 is skipped and the process continues at block 606. Otherwise, if a thermally-cooled device is present that is associated with a function of the controllable device 108, then at block 604, the example function modification circuitry 216 determines if a thermal condition of the thermally-cooled device satisfies a function modification threshold. For example, if the thermal condition of a CPU cooled by a CPU cooling fan is at 90 degrees Celsius and the maximum thermal design for the CPU is to operate at 100 degrees Celsius, then the function modification threshold is satisfied. For example, if the current CPU temperature is 10 degrees Celsius below the maximum threshold temperature, then there is additional temperature range (e.g., headroom) for the CPU's temperature to increase before the maximum operational temperature is reached. Thus, in some examples, the CPU cooling fan function may be modified (e.g., to reduce background sound). If the thermal condition of the thermally-cooled device does not satisfy the function modification threshold (block 604: NO), then the process repeats by continuing to repeat block 604. For example, block 604 may repeat until the function modification threshold is satisfied or until a process-ending event (e.g., a conference call ends, a power-down event, etc.) occurs. In some examples, block 604 is repeated at configured time-intervals that are determined based on the speed at which a temperature of a thermally-cooled device would normally change by a certain amount. If the thermal condition of the thermally-cooled device does satisfy the function modification threshold (block 604: YES), control advances to block 606.

At block 606, the function modification circuitry 216 may perform a modification to a function of a controllable device 108. In some examples, the function modification circuitry 216 may cause a decibel level of an output sound of the controllable device 108 to be reduced through a modification of the function (block 606a). For example, the function modification circuitry 216 may reduce the speed of a fan or may reduce the volume of a speaker output, but not disable such function. In some examples, the function modification circuitry 216 may prevent activation of the function of the controllable device (block 606b). For example, the function modification circuitry 216 may mute a speaker or turn off a fan so no sound is produced.

At block 608, the example microphone management circuitry 218 (FIG. 2) may determine whether a user's voice is absent from the audio input to a microphone 104 for a period of time or that audio input of the microphone 104 is manually muted by a user. If neither condition is present (e.g., the user's voice is present and the user has not indicated a request to mute the microphone 104), then block 608 repeats. For example, block 608 may repeat until the conditions of block 608 are detected or until a process-ending event (e.g., a conference call ends, a power-down event, etc.) occurs. Otherwise, if either condition is present (e.g., the user's voice is absent or the user indicates a request to mute the microphone 104), then, at block 610, the example microphone management circuitry 608 will mute the microphone. After the microphone is muted, then at block 612, the function modification circuitry 216 unmodifies the function of the controllable device 108. For example, the function modification circuitry 216 may transmit/send a signal to the controllable device 108 to return to normal functions (e.g., unmute a speaker, return a fan to a previous fan speed, etc.). After block 612 is completed, the machine readable instructions and/or operations of FIG. 6 end.

Figure 7:
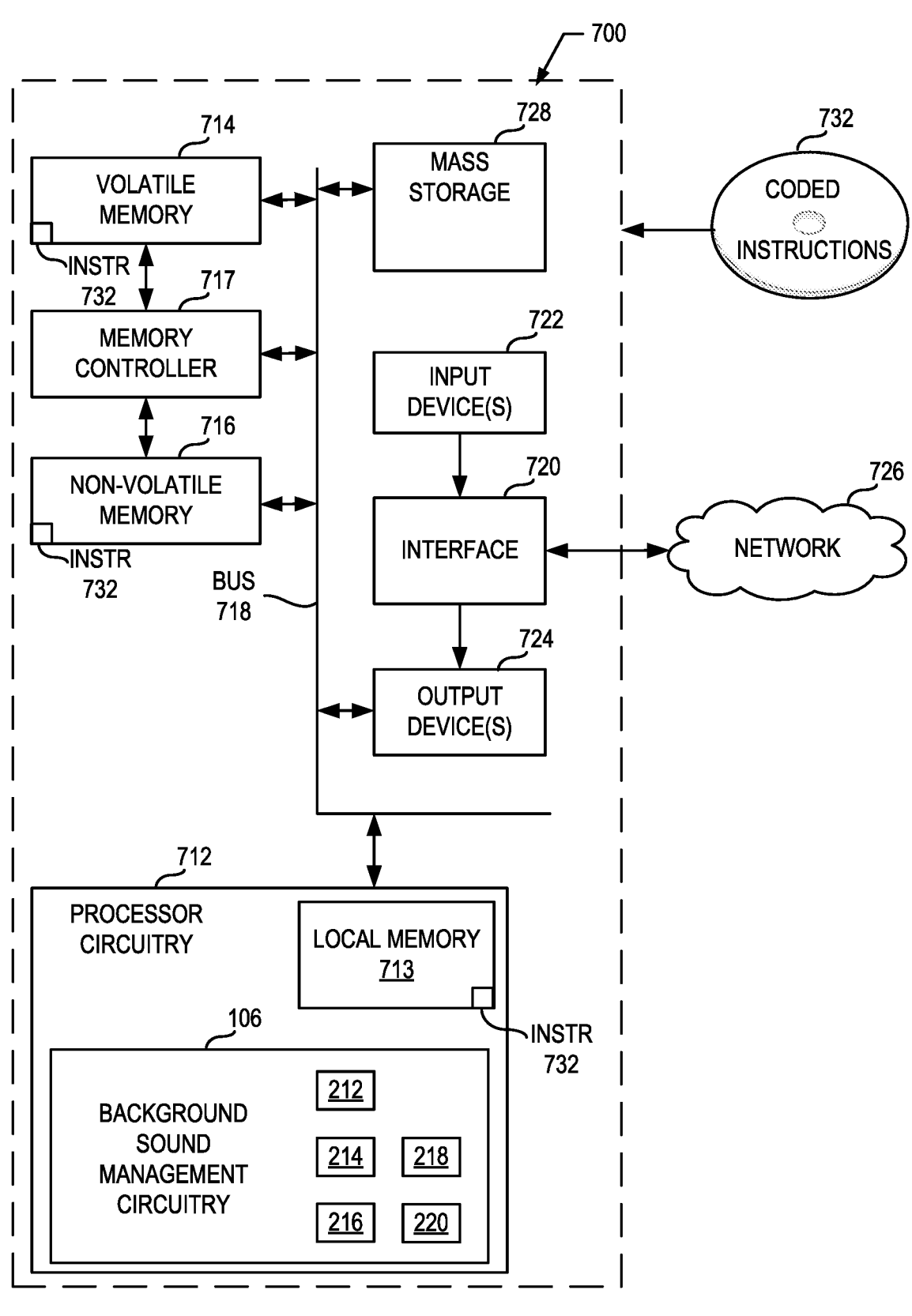
FIG. 7 is a block diagram of an example processing platform including processor circuitry structured to execute the example machine readable instructions and/or the example operations of FIG. 4 to implement the background sound management circuitry of FIG. 2.

FIG. 7 is a block diagram of an example processor platform 700 structured to execute and/or instantiate the machine readable instructions and/or the operations of FIGS. 4-6 to implement the apparatus of FIG. 2. The processor platform 700 can be, for example, a personal computer, a workstation, a self-learning machine (e.g., a neural network), a mobile device (e.g., a cell phone, a smart phone, a tablet such as an iPad™), a personal digital assistant (PDA), an Internet appliance, a gaming console, a set top box, a headset (e.g., an augmented reality (AR) headset, a virtual reality (VR) headset, etc.) or other wearable device, or any other type of computing device.

The processor platform 700 of the illustrated example includes processor circuitry 712. The processor circuitry 712 of the illustrated example is hardware. For example, the processor circuitry 712 can be implemented by one or more integrated circuits, logic circuits, FPGAs, microprocessors, CPUs, GPUs, DSPs, and/or microcontrollers from any desired family or manufacturer. The processor circuitry 712 may be implemented by one or more semiconductor based (e.g., silicon based) devices. In this example, the processor circuitry 712 implements device discover management circuitry 212, output sound capability determination circuitry 214, function modification circuitry 216, microphone management circuitry 218, communication management circuitry 220, and/or, more generally, background sound management circuitry 106.

The processor circuitry 712 of the illustrated example includes a local memory 713 (e.g., a cache, registers, etc.). The processor circuitry 712 of the illustrated example is in communication with a main memory including a volatile memory 714 and a non-volatile memory 716 by a bus 718. The volatile memory 714 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 716 may be implemented by flash memory and/or any other desired type of memory device. Access to the main memory 714, 716 of the illustrated example is controlled by a memory controller 717.

The processor platform 700 of the illustrated example also includes interface circuitry 720. The interface circuitry 720 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 722 are connected to the interface circuitry 720. The input device(s) 722 permit(s) a user to enter data and/or commands into the processor circuitry 712. The input device(s) 722 can be implemented by, for example, an audio sensor, a microphone, a camera (still or video), a keyboard, a button, a mouse, a touchscreen, a track-pad, a trackball, an isopoint device, and/or a voice recognition system.

One or more output devices 724 are also connected to the interface circuitry 720 of the illustrated example. The output device(s) 724 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 720 of the illustrated example, thus, typically includes a graphics driver card, a graphics driver chip, and/or graphics processor circuitry such as a GPU.

The interface circuitry 720 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 726. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 700 of the illustrated example also includes one or more mass storage devices 728 to store software and/or data. Examples of such mass storage devices 728 include magnetic storage devices, optical storage devices, floppy disk drives, HDDs, CDs, Blu-ray disk drives, redundant array of independent disks (RAID) systems, solid state storage devices such as flash memory devices and/or SSDs, and DVD drives.

The machine readable instructions 732, which may be implemented by the machine readable instructions of FIGS. 4-6, may be stored in the mass storage device 728, in the volatile memory 714, in the non-volatile memory 716, and/or on a removable non-transitory computer readable storage medium such as a CD or DVD.

Figure 8:
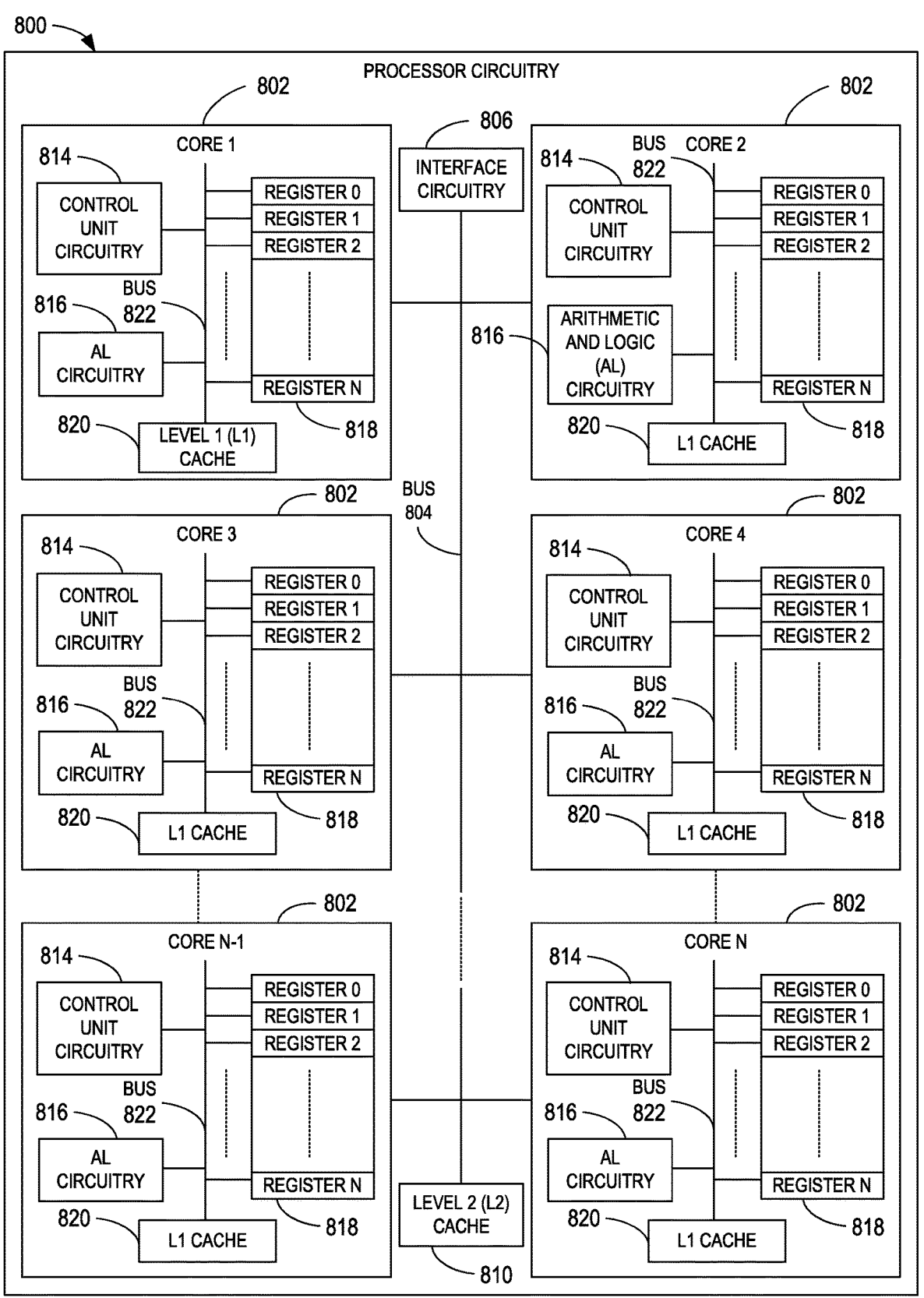
FIG. 8 is a block diagram of an example implementation of the processor circuitry of FIG. 7.

FIG. 8 is a block diagram of an example implementation of the processor circuitry 712 of FIG. 7. In this example, the processor circuitry 712 of FIG. 7 is implemented by a microprocessor 800. For example, the microprocessor 800 may be a general purpose microprocessor (e.g., general purpose microprocessor circuitry). The microprocessor 800 executes some or all of the machine readable instructions of the flowcharts of FIGS. 4-6 to effectively instantiate the circuitry of FIG. 2 as logic circuits to perform the operations corresponding to those machine readable instructions. In some such examples, the circuitry of FIG. 2 is instantiated by the hardware circuits of the microprocessor 800 in combination with the instructions. For example, the microprocessor 800 may be implemented by multi-core hardware circuitry such as a CPU, a DSP, a GPU, an XPU, etc. Although it may include any number of example cores 802 (e.g., 1 core), the microprocessor 800 of this example is a multi-core semiconductor device including N cores. The cores 802 of the microprocessor 800 may operate independently or may cooperate to execute machine readable instructions. For example, machine code corresponding to a firmware program, an embedded software program, or a software program may be executed by one of the cores 802 or may be executed by multiple ones of the cores 802 at the same or different times. In some examples, the machine code corresponding to the firmware program, the embedded software program, or the software program is split into threads and executed in parallel by two or more of the cores 802. The software program may correspond to a portion or all of the machine readable instructions and/or operations represented by the flowcharts of FIGS. 4-6.

The cores 802 may communicate by a first example bus 804. In some examples, the first bus 804 may be implemented by a communication bus to effectuate communication associated with one(s) of the cores 802. For example, the first bus 804 may be implemented by at least one of an Inter-Integrated Circuit (I2C) bus, a Serial Peripheral Interface (SPI) bus, a PCI bus, or a PCIe bus. Additionally or alternatively, the first bus 804 may be implemented by any other type of computing or electrical bus. The cores 802 may obtain data, instructions, and/or signals from one or more external devices by example interface circuitry 806. The cores 802 may output data, instructions, and/or signals to the one or more external devices by the interface circuitry 806. Although the cores 802 of this example include example local memory 820 (e.g., Level 1 (L1) cache that may be split into an L1 data cache and an L1 instruction cache), the microprocessor 800 also includes example shared memory 810 that may be shared by the cores (e.g., Level 2 (L2 cache)) for high-speed access to data and/or instructions. Data and/or instructions may be transferred (e.g., shared) by writing to and/or reading from the shared memory 810. The local memory 820 of each of the cores 802 and the shared memory 810 may be part of a hierarchy of storage devices including multiple levels of cache memory and the main memory (e.g., the main memory 714, 716 of FIG. 7). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 802 may be referred to as a CPU, DSP, GPU, etc., or any other type of hardware circuitry. Each core 802 includes control unit circuitry 814, arithmetic and logic (AL) circuitry (sometimes referred to as an ALU) 816, a plurality of registers 818, the local memory 820, and a second example bus 822. Other structures may be present. For example, each core 802 may include vector unit circuitry, single instruction multiple data (SIMD) unit circuitry, load/store unit (LSU) circuitry, branch/jump unit circuitry, floating-point unit (FPU) circuitry, etc. The control unit circuitry 814 includes semiconductor-based circuits structured to control (e.g., coordinate) data movement within the corresponding core 802. The AL circuitry 816 includes semiconductor-based circuits structured to perform one or more mathematic and/or logic operations on the data within the corresponding core 802. The AL circuitry 816 of some examples performs integer based operations. In other examples, the AL circuitry 816 also performs floating point operations. In yet other examples, the AL circuitry 816 may include first AL circuitry that performs integer based operations and second AL circuitry that performs floating point operations. In some examples, the AL circuitry 816 may be referred to as an Arithmetic Logic Unit (ALU). The registers 818 are semiconductor-based structures to store data and/or instructions such as results of one or more of the operations performed by the AL circuitry 816 of the corresponding core 802. For example, the registers 818 may include vector register(s), SIMD register(s), general purpose register(s), flag register(s), segment register(s), machine specific register(s), instruction pointer register(s), control register(s), debug register(s), memory management register(s), machine check register(s), etc. The registers 818 may be arranged in a bank as shown in FIG. 8. Alternatively, the registers 818 may be organized in any other arrangement, format, or structure including distributed throughout the core 802 to shorten access time. The second bus 822 may be implemented by at least one of an I2C bus, a SPI bus, a PCI bus, or a PCIe bus Each core 802 and/or, more generally, the microprocessor 800 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 800 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 9:
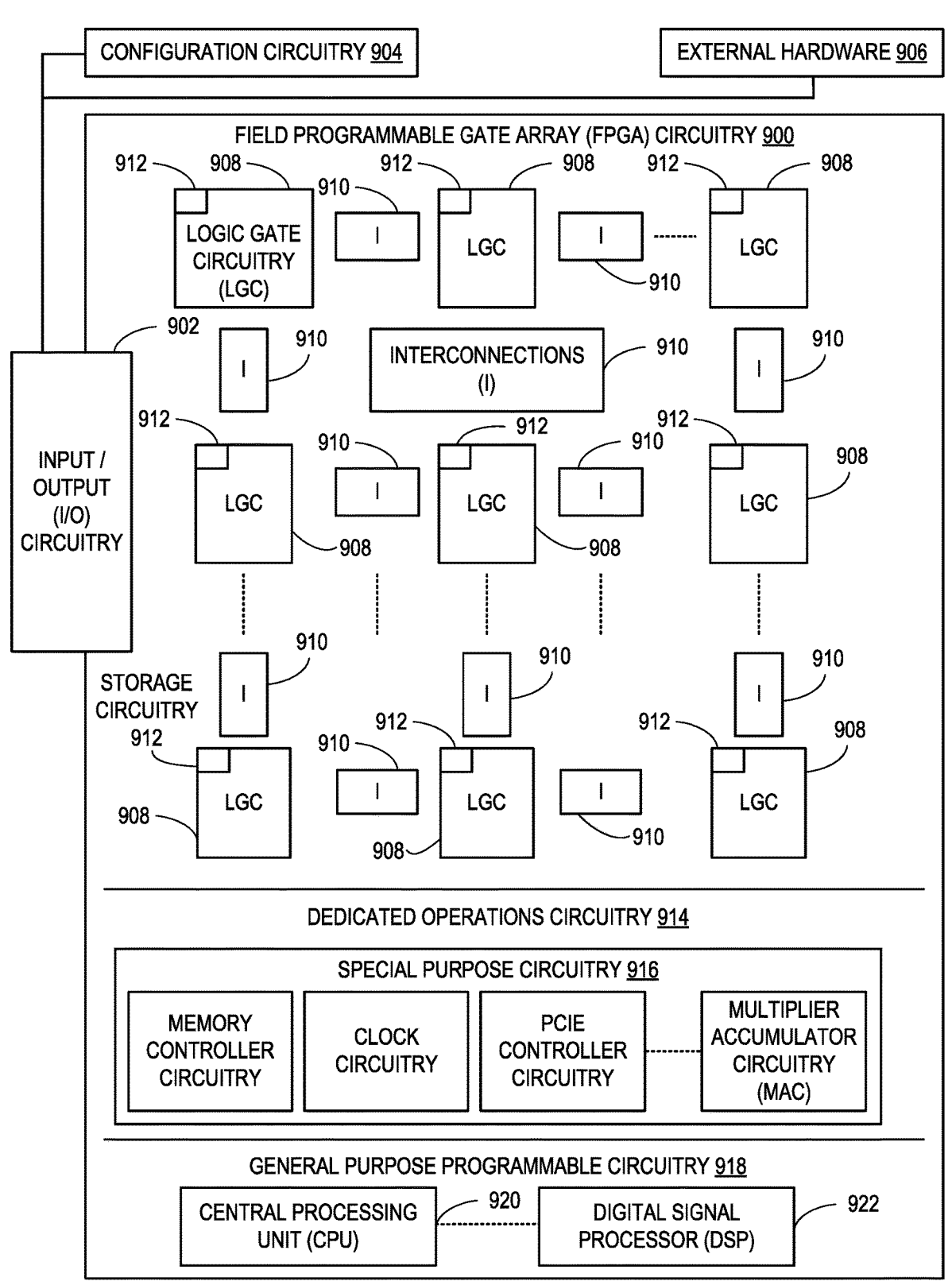
FIG. 9 is a block diagram of another example implementation of the processor circuitry of FIG. 7.

FIG. 9 is a block diagram of another example implementation of the processor circuitry 712 of FIG. 7. In this example, the processor circuitry 712 is implemented by FPGA circuitry 900. For example, the FPGA circuitry 900 may be implemented by an FPGA. The FPGA circuitry 900 can be used, for example, to perform operations that could otherwise be performed by the example microprocessor 800 of FIG. 8 executing corresponding machine readable instructions. However, once configured, the FPGA circuitry 900 instantiates the machine readable instructions in hardware and, thus, can often execute the operations faster than they could be performed by a general purpose microprocessor executing the corresponding software.

More specifically, in contrast to the microprocessor 800 of FIG. 8 described above (which is a general purpose device that may be programmed to execute some or all of the machine readable instructions represented by the flowcharts of FIGS. 4-6 but whose interconnections and logic circuitry are fixed once fabricated), the FPGA circuitry 900 of the example of FIG. 9 includes interconnections and logic circuitry that may be configured and/or interconnected in different ways after fabrication to instantiate, for example, some or all of the machine readable instructions represented by the flowcharts of FIGS. 4-6. In particular, the FPGA circuitry 900 may be thought of as an array of logic gates, interconnections, and switches. The switches can be programmed to change how the logic gates are interconnected by the interconnections, effectively forming one or more dedicated logic circuits (unless and until the FPGA circuitry 900 is reprogrammed). The configured logic circuits enable the logic gates to cooperate in different ways to perform different operations on data received by input circuitry. Those operations may correspond to some or all of the software represented by the flowcharts of FIGS. 4-6. As such, the FPGA circuitry 900 may be structured to effectively instantiate some or all of the machine readable instructions of the flowcharts of FIGS. 4-6 as dedicated logic circuits to perform the operations corresponding to those software instructions in a dedicated manner analogous to an ASIC. Therefore, the FPGA circuitry 900 may perform the operations corresponding to the some or all of the machine readable instructions of FIGS. 4-6 faster than the general purpose microprocessor can execute the same.

In the example of FIG. 9, the FPGA circuitry 900 is structured to be programmed (and/or reprogrammed one or more times) by an end user by a hardware description language (HDL) such as Verilog. The FPGA circuitry 900 of FIG. 9, includes example input/output (I/O) circuitry 902 to obtain and/or output data to/from example configuration circuitry 904 and/or external hardware 906. For example, the configuration circuitry 904 may be implemented by interface circuitry that may obtain machine readable instructions to configure the FPGA circuitry 900, or portion(s) thereof. In some such examples, the configuration circuitry 904 may obtain the machine readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 906 may be implemented by external hardware circuitry. For example, the external hardware 906 may be implemented by the microprocessor 800 of FIG. 8. The FPGA circuitry 900 also includes an array of example logic gate circuitry 908, a plurality of example configurable interconnections 910, and example storage circuitry 912. The logic gate circuitry 908 and the configurable interconnections 910 are configurable to instantiate one or more operations that may correspond to at least some of the machine readable instructions of FIGS. 4-6 and/or other desired operations. The logic gate circuitry 908 shown in FIG. 9 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 908 to enable configuration of the electrical structures and/or the logic gates to form circuits to perform desired operations. The logic gate circuitry 908 may include other electrical structures such as look-up tables (LUTs), registers (e.g., flip-flops or latches), multiplexers, etc.

The configurable interconnections 910 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 908 to program desired logic circuits.

The storage circuitry 912 of the illustrated example is structured to store result(s) of the one or more of the operations performed by corresponding logic gates. The storage circuitry 912 may be implemented by registers or the like. In the illustrated example, the storage circuitry 912 is distributed amongst the logic gate circuitry 908 to facilitate access and increase execution speed.

The example FPGA circuitry 900 of FIG. Y also includes example Dedicated Operations Circuitry 914. In this example, the Dedicated Operations Circuitry 914 includes special purpose circuitry 916 that may be invoked to implement commonly used functions to avoid the need to program those functions in the field. Examples of such special purpose circuitry 916 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 900 may also include example general purpose programmable circuitry 918 such as an example CPU 920 and/or an example DSP 922. Other general purpose programmable circuitry 918 may additionally or alternatively be present such as a GPU, an XPU, etc., that can be programmed to perform other operations.

Although FIGS. 8 and 6 illustrate two example implementations of the processor circuitry 712 of FIG. 7, many other approaches are contemplated. For example, as mentioned above, modern FPGA circuitry may include an on-board CPU, such as one or more of the example CPU 920 of FIG. 9. Therefore, the processor circuitry 712 of FIG. 7 may additionally be implemented by combining the example microprocessor 800 of FIG. 8 and the example FPGA circuitry 900 of FIG. 9. In some such hybrid examples, a first portion of the machine readable instructions represented by the flowcharts of FIGS. 4-6 may be executed by one or more of the cores 802 of FIG. 8, a second portion of the machine readable instructions represented by the flowcharts of FIGS. 4-6 may be executed by the FPGA circuitry 900 of FIG. 9, and/or a third portion of the machine readable instructions represented by the flowcharts of FIGS. 4-6 may be executed by an ASIC. It should be understood that some or all of the circuitry of FIG. 2 may, thus, be instantiated at the same or different times. Some or all of the circuitry may be instantiated, for example, in one or more threads executing concurrently and/or in series. Moreover, in some examples, some or all of the circuitry of FIG. 2 may be implemented within one or more virtual machines and/or containers executing on the microprocessor.

In some examples, the processor circuitry 712 of FIG. 7 may be in one or more packages. For example, the microprocessor 800 of FIG. 8 and/or the FPGA circuitry 900 of FIG. 9 may be in one or more packages. In some examples, an XPU may be implemented by the processor circuitry 712 of FIG. 7, which may be in one or more packages. For example, the XPU may include a CPU in one package, a DSP in another package, a GPU in yet another package, and an FPGA in still yet another package.

Figure 10:
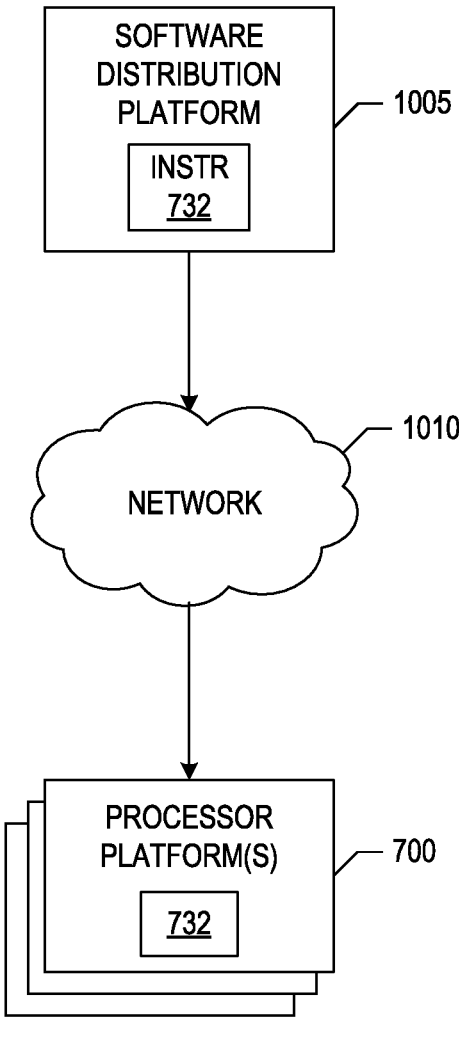
FIG. 10 is a block diagram of an example software distribution platform (e.g., one or more servers) to distribute software (e.g., software corresponding to the example machine readable instructions of FIGS. 4-6) to client devices associated with end users and/or consumers (e.g., for license, sale, and/or use), retailers (e.g., for sale, re-sale, license, and/or sub-license), and/or original equipment manufacturers (OEMs) (e.g., for inclusion in products to be distributed to, for example, retailers and/or to other end users such as direct buy customers).

A block diagram illustrating an example software distribution platform 1005 to distribute software such as the example machine readable instructions 732 of FIG. 7 to hardware devices owned and/or operated by third parties is illustrated in FIG. 10. The example software distribution platform 1005 may be implemented by any computer server, data facility, cloud service, etc., capable of storing and transmitting software to other computing devices. The third parties may be customers of the entity owning and/or operating the software distribution platform 1005. For example, the entity that owns and/or operates the software distribution platform 1005 may be a developer, a seller, and/or a licensor of software such as the example machine readable instructions 732 of FIG. 7. The third parties may be consumers, users, retailers, OEMs, etc., who purchase and/or license the software for use and/or re-sale and/or sub-licensing. In the illustrated example, the software distribution platform 1005 includes one or more servers and one or more storage devices. The storage devices store the machine readable instructions 732, which may correspond to the example machine readable instructions 400, 500, 600, etc. of FIGS. 4-6, as described above. The one or more servers of the example software distribution platform 1005 are in communication with an example network 1010, which may correspond to any one or more of the Internet and/or any of the example networks described above. In some examples, the one or more servers are responsive to requests to transmit the software to a requesting party as part of a commercial transaction. Payment for the delivery, sale, and/or license of the software may be handled by the one or more servers of the software distribution platform and/or by a third party payment entity. The servers enable purchasers and/or licensors to download the machine readable instructions 732 from the software distribution platform 1005. For example, the software, which may correspond to the example machine readable instructions 400, 500, 600, etc. of FIGS. 4-6, may be downloaded to the example processor platform 700, which is to execute the machine readable instructions 732 to implement the background sound management circuitry 106 of FIG. 2. In some examples, one or more servers of the software distribution platform 1005 periodically offer, transmit, and/or force updates to the software (e.g., the example machine readable instructions 732 of FIG. 7) to ensure improvements, patches, updates, etc., are distributed and applied to the software at the end user devices.

From the foregoing, it will be appreciated that example systems, methods, apparatus, and articles of manufacture have been disclosed that dynamically manage audibly proximate devices during user activities. Disclosed systems, methods, apparatus, and articles of manufacture improve the efficiency of using a computing device by managing the background sound that may interfere with clear audible communications during a audio/video conference as well as providing a management system for incoming communications during the conference across devices in an audible proximity to a microphone. Disclosed systems, methods, apparatus, and articles of manufacture are accordingly directed to one or more improvement(s) in the operation of a machine such as a computer or other electronic and/or mechanical device.

Further examples and combinations thereof include the following:

Example 1 includes an apparatus to manage background sound in a conference call, comprising interface circuitry to communicatively couple processor circuitry to memory, and the processor circuitry including one or more of at least one of a central processor unit, a graphics processor unit, or a digital signal processor, the at least one of the central processor unit, the graphics processor unit, or the digital signal processor having control circuitry to control data movement within the processor circuitry, arithmetic and logic circuitry to perform one or more first operations corresponding to instructions, and one or more registers to store a result of the one or more first operations, the instructions in the apparatus, a Field Programmable Gate Array (FPGA), the FPGA including logic gate circuitry, a plurality of configurable interconnections, and storage circuitry, the logic gate circuitry and the plurality of the configurable interconnections to perform one or more second operations, the storage circuitry to store a result of the one or more second operations, or Application Specific Integrated Circuitry (ASIC) including logic gate circuitry to perform one or more third operations, the processor circuitry to perform at least one of the first operations, the second operations, or the third operations to instantiate device discovery management circuitry to discover a controllable device in audible proximity to a microphone, the microphone associated with a primary device, output sound capability determination circuitry to determine an output sound capability of the controllable device, and function modification circuitry to modify a function of the controllable device to reduce the output sound capability.

Example 2 includes the apparatus of example 1, wherein to reduce the output sound capability includes to cause a decibel level of an output sound of the controllable device to be reduced.

Example 3 includes the apparatus of example 1, wherein to reduce the output sound capability includes to prevent activation of the function of the controllable device.

Example 4 includes the apparatus of example 1, wherein the processor circuitry is to perform the at least one of the first operations, the second operations, or the third operations to instantiate microphone management circuitry to detect an absence of a voice as audio input into the microphone for a period of time, and mute the audio input of the microphone after detecting the absence of the voice for the period of time, and the function modification circuitry to unmodify the function of the controllable device after muting the audio input of the microphone.

Example 5 includes the apparatus of example 1, wherein the processor circuitry is to perform the at least one of the first operations, the second operations, or the third operations to instantiate communication management circuitry to initiate a primary device communication inquiry queue, and the function modification circuitry to send a signal to the controllable device to cause the controllable device to initiate a silent mode of operation.

Example 6 includes the apparatus of example 5, wherein the processor circuitry is to perform the at least one of the first operations, the second operations, or the third operations to instantiate the communication management circuitry to cause the controllable device to generate a user busy reply after a communication inquiry is received at the controllable device, and cause the controllable device to transfer the communication inquiry to the primary device.

Example 7 includes the apparatus of example 5, wherein the processor circuitry is to perform the at least one of the first operations, the second operations, or the third operations to instantiate the communication management circuitry to compare a priority level of the communication inquiry to a threshold priority level, and provide an indicator of the communication inquiry on the primary device after the priority level satisfies the threshold priority level.

Example 8 includes the apparatus of example 1, wherein the controllable device is a personal communication device.

Example 9 includes the apparatus of example 1, wherein the controllable device is a controller of a mechanical implement.

Example 10 includes the apparatus of example 9, wherein to determine the output sound capability of the controllable device, the processor circuitry is to perform the at least one of the first operations, the second operations, or the third operations to instantiate the output sound capability determination circuitry to determine a decibel range of the controllable device by testing a range of the function of the controllable device.

Example 11 includes the apparatus of example 1, wherein the processor circuitry is to perform the at least one of the first operations, the second operations, or the third operations to instantiate the function modification circuitry to determine whether a current thermal condition of a thermally-cooled device satisfies a function modification threshold, and at least temporarily prohibit the modifying of the function when the current thermal condition does not satisfy the function modification threshold.

Example 12 includes a non-transitory machine readable storage medium comprising instructions that, when executed, cause processor circuitry to at least discover a controllable device in audible proximity to a microphone, the microphone associated with a primary device, determine an output sound capability of the controllable device, and modify a function of the controllable device to reduce the output sound capability.

Example 13 includes the non-transitory machine readable storage medium of example 12, wherein to reduce the output sound capability includes to cause a decibel level of an output sound of the controllable device to be reduced.

Example 14 includes the non-transitory machine readable storage medium of example 12, wherein to reduce the output sound capability includes to prevent activation of the function of the controllable device.

Example 15 includes the non-transitory machine readable storage medium of example 12, wherein the instructions are to cause the processor circuitry to detect an absence of a voice as audio input into the microphone for a period of time, and mute the audio input of the microphone after detecting the absence of the voice for the period of time, and unmodify the function of the controllable device after muting the audio input of the microphone.

Example 16 includes the non-transitory machine readable storage medium of example 12, wherein the instructions are to cause the processor circuitry to send a signal to the controllable device to cause the controllable device to initiate a silent mode of operation, and initiate a primary device communication inquiry queue.

Example 17 includes the non-transitory machine readable storage medium of example 16, wherein the instructions are to cause the processor circuitry to cause the controllable device to generate a user busy reply after a communication inquiry is received at the controllable device, and cause the controllable device to transfer the communication inquiry to the primary device.

Example 18 includes the non-transitory machine readable storage medium of example 16, wherein the instructions are to cause the processor circuitry to compare a priority level of the communication inquiry to a threshold, and provide an indicator of the communication inquiry on the primary device after the priority level satisfies the threshold.

Example 19 includes the non-transitory machine readable storage medium of example 12, wherein the controllable device is a personal communication device.

Example 20 includes the non-transitory machine readable storage medium of example 12, wherein the controllable device is a controller of a mechanical implement.

Example 21 includes the non-transitory machine readable storage medium of example 20, wherein the instructions are to cause the processor circuitry to determine the output sound capability of the controllable device by determining a decibel range of the controllable device through a test of a range of the function of the controllable device.

Example 22 includes the non-transitory machine readable storage medium of example 20, wherein the instructions are to cause the processor circuitry to determine whether a current thermal condition of a thermally-cooled device satisfies a function modification threshold, and at least temporarily prevent the modifying of the function when the current thermal condition does not satisfy the function modification threshold.

Example 23 includes a method, comprising discovering, by executing an instruction with a processor, a controllable device in audible proximity to a microphone, the microphone associated with a primary device, determining, by executing an instruction with the processor, an output sound capability of the controllable device, and modifying, by executing an instruction with the processor, a function of the controllable device to reduce the output sound capability.

Example 24 includes the method of example 23, wherein to reduce the output sound capability includes causing a decibel level of an output sound of the controllable device to be reduced.

Example 25 includes the method of example 23, further including sending a signal to the controllable device to cause the controllable device to initiate a silent mode of operation, and initiating a primary device communication inquiry queue.

Example 26 includes the method of example 25, further including causing the controllable device to generate a user busy reply after a communication inquiry is received at the controllable device, and causing the controllable device to transfer the communication inquiry to the primary device.

Example 27 includes the method of example 25, further including comparing a priority level of the communication inquiry to a threshold, and providing an indicator of the communication inquiry on the primary device after the priority level satisfies the threshold.

Example 28 includes the method of example 23, wherein the controllable device is a personal communication device.

Example 29 includes the method of example 23, wherein the controllable device is a controller of a mechanical implement.

Example 30 includes the method of example 29, further including determining the output sound capability of the controllable device by determining a decibel range of the controllable device through a test of a range of the function of the controllable device.

Example 31 includes the method of example 23, further including determining whether a current thermal condition of a thermally-cooled device satisfies a function modification threshold, and at least temporarily preventing the modifying of the function when the current thermal condition does not satisfy the function modification threshold.

The following claims are hereby incorporated into this Detailed Description by this reference. Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

What is claimed is:

1. An apparatus to manage background sound in a conference call, comprising:
    interface circuitry to communicatively couple processor circuitry to memory; and
    the processor circuitry including one or more of:
        at least one of a central processor unit, a graphics processor unit, or a digital signal processor, the at least one of the central processor unit, the graphics processor unit, or the digital signal processor having control circuitry to control data movement within the processor circuitry, arithmetic and logic circuitry to perform one or more first operations corresponding to instructions, and one or more registers to store a result of the one or more first operations, the instructions in the apparatus;
        a Field Programmable Gate Array (FPGA), the FPGA including logic gate circuitry, a plurality of configurable interconnections, and storage circuitry, the logic gate circuitry and the plurality of the configurable interconnections to perform one or more second operations, the storage circuitry to store a result of the one or more second operations; or
        Application Specific Integrated Circuitry (ASIC) including logic gate circuitry to perform one or more third operations;
    the processor circuitry to perform at least one of the first operations, the second operations, or the third operations to instantiate:
        device discovery management circuitry to discover a controllable device in audible proximity to a microphone, the microphone associated with a primary device;
        output sound capability determination circuitry to determine an output sound capability of the controllable device;

microphone management circuitry to:
    detect an absence of a voice as audio input into the microphone for a period of time; and
    mute the audio input of the microphone after detecting the absence of the voice for the period of time; and
function modification circuitry to modify a function of the controllable device to reduce the output sound capability, the function modification circuitry to undo the modification of the function of the controllable device after muting the audio input of the microphone.

2. The apparatus of claim 1, wherein to reduce the output sound capability includes to cause a decibel level of an output sound of the controllable device to be reduced.

3. The apparatus of claim 1, wherein to reduce the output sound capability includes to prevent activation of the function of the controllable device.

4. The apparatus of claim 1, wherein the processor circuitry is to perform the at least one of the first operations, the second operations, or the third operations to instantiate:
    communication management circuitry to initiate a primary device communication inquiry queue; and
    the function modification circuitry to send a signal to the controllable device to cause the controllable device to initiate a silent mode of operation.

5. The apparatus of claim 4, wherein the processor circuitry is to perform the at least one of the first operations, the second operations, or the third operations to instantiate:
    the communication management circuitry to:
        cause the controllable device to generate a user busy reply after a communication inquiry is received at the controllable device; and
        cause the controllable device to transfer the communication inquiry to the primary device.

6. The apparatus of claim 4, wherein the processor circuitry is to perform the at least one of the first operations, the second operations, or the third operations to instantiate:
    the communication management circuitry to:
        compare a priority level of the communication inquiry to a threshold priority level; and
        provide an indicator of the communication inquiry on the primary device after the priority level satisfies the threshold priority level.

7. The apparatus of claim 1, wherein the controllable device is a personal communication device.

8. The apparatus of claim 1, wherein the controllable device is a controller of a mechanical implement.

9. The apparatus of claim 8, wherein to determine the output sound capability of the controllable device, the processor circuitry is to perform the at least one of the first operations, the second operations, or the third operations to instantiate the output sound capability determination circuitry to determine a decibel range of the controllable device by testing a range of the function of the controllable device.

10. The apparatus of claim 1, wherein the processor circuitry is to perform the at least one of the first operations, the second operations, or the third operations to instantiate:
    the function modification circuitry to:
        determine whether a current thermal condition of a thermally-cooled device satisfies a function modification threshold; and
        at least temporarily prohibit the modifying of the function when the current thermal condition does not satisfy the function modification threshold.

11. A non-transitory machine readable storage medium comprising instructions that, when executed, cause one or more processor circuits to at least:

discover a controllable device in audible proximity to a microphone, the microphone associated with a primary device;

determine an output sound capability of the controllable device;

cause the controllable device to generate a user busy reply after a communication inquiry is received at the controllable device; and cause the controllable device to transfer a communication inquiry to the primary device; and modify a function of the controllable device to reduce the output sound capability.

12. The non-transitory machine readable storage medium of claim 11, wherein to reduce the output sound capability, one or more of the at least one processor circuit is to cause a decibel level of an output sound of the controllable device to be reduced.

13. The non-transitory machine readable storage medium of claim 11, wherein to reduce the output sound capability, one or more of the at least one processor circuit is to prevent activation of the function of the controllable device.

14. The non-transitory machine readable storage medium of claim 11, wherein the instructions are to cause one or more of the at least one processor circuit to:

detect an absence of a voice as audio input into the microphone for a period of time; and mute the audio input of the microphone after detecting the absence of the voice for the period of time; and unmodify the function of the controllable device after muting the audio input of the microphone.

15. The non-transitory machine readable storage medium of claim 11, wherein the instructions are to cause one or more of the at least one processor circuit to:

send a signal to the controllable device to cause the controllable device to initiate a silent mode of operation; and initiate a primary device communication inquiry queue.

16. The non-transitory machine readable storage medium of claim 11, wherein the instructions are to cause one or more of the at least one processor circuit to:

compare a priority level of the communication inquiry to a threshold; and provide an indicator of the communication inquiry on the primary device after the priority level satisfies the threshold.

17. The non-transitory machine readable storage medium of claim 11, wherein the controllable device is a personal communication device.

18. The non-transitory machine readable storage medium of claim 11, wherein the controllable device is a controller of a mechanical implement.

19. The non-transitory machine readable storage medium of claim 18, wherein the instructions are to cause one or more of the at least one processor circuit to determine the output sound capability of the controllable device by determining a decibel range of the controllable device through a test of a range of the function of the controllable device.

20. The non-transitory machine readable storage medium of claim 18, wherein the instructions are to cause one or more of the at least one processor circuit to:

determine whether a current thermal condition of a thermally-cooled device satisfies a function modification threshold; and at least temporarily prevent the modifying of the function when the current thermal condition does not satisfy the function modification threshold.

21. A method, comprising:

discovering, by executing an instruction with a processor, a controllable device in audible proximity to a microphone, the microphone associated with a primary device;

determining, by executing an instruction with the processor, an output sound capability of the controllable device;

determine whether a current thermal condition of a thermally-cooled device satisfies a function modification threshold;

at least temporarily prohibit the modification of the function when the current thermal condition does not satisfy the function modification threshold; and modifying, by executing an instruction with the processor, a function of the controllable device to reduce the output sound capability.

22. The method of claim 21, wherein to reduce the output sound capability includes causing a decibel level of an output sound of the controllable device to be reduced.

23. The method of claim 21, further including:

sending a signal to the controllable device to cause the controllable device to initiate a silent mode of operation; and initiating a primary device communication inquiry queue.

24. A non-transitory machine readable storage medium comprising instructions that, when executed, cause at least one processor circuit to at least:

discover a controllable device in audible proximity to a microphone, the microphone associated with a primary device;

determine an output sound capability of the controllable device;

compare a priority level of a communication inquiry sent by the controllable device to a threshold priority level;

provide an indicator of the communication inquiry on the primary device after the priority level satisfies the threshold priority level; and modify a function of the controllable device to reduce the output sound capability.

* * * * *